(12) United States Patent
Taguchi et al.

(10) Patent No.: US 11,892,829 B2
(45) Date of Patent: Feb. 6, 2024

(54) MONITORING APPARATUS, METHOD, AND PROGRAM

(71) Applicants: KABUSHIKI KAISHA TOSHIBA, Tokyo (JP); Toshiba Energy Systems & Solutions Corporation, Kawasaki (JP)

(72) Inventors: Yasunori Taguchi, Kawasaki Kanagawa (JP); Kouta Nakata, Tokyo (JP); Susumu Naito, Yokohama Kanagawa (JP); Yuichi Kato, Kawasaki Kanagawa (JP); Eiichi Ookuma, Matsudo Chiba (JP); Toshio Aoki, Tokyo (JP); Chikashi Miyamoto, Yokohama Kanagawa (JP)

(73) Assignees: KABUSHIKI KAISHA TOSHIBA, Tokyo (JP); TOSHIBA ENERGY SYSTEMS & SOULTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/680,374

(22) Filed: Feb. 25, 2022

(65) Prior Publication Data
US 2023/0084342 A1   Mar. 16, 2023

(30) Foreign Application Priority Data
Sep. 15, 2021  (JP) ................. 2021-150380

(51) Int. Cl.
*G05B 23/02* (2006.01)
(52) U.S. Cl.
CPC ..... *G05B 23/0254* (2013.01); *G05B 23/0208* (2013.01)

(58) Field of Classification Search
CPC ............ G05B 23/0254; G05B 23/0208; G05B 23/0245; G05B 23/0235
See application file for complete search history.

(56) References Cited

U.S. PATENT DOCUMENTS

2012/0166142 A1* 6/2012 Maeda ............... G05B 23/0227
702/185
2013/0173218 A1* 7/2013 Maeda ............... G05B 23/0224
702/182
(Continued)

FOREIGN PATENT DOCUMENTS

JP    H07287794 A    10/1995
JP    6564799 B2    8/2019
(Continued)

OTHER PUBLICATIONS

Leakage Detection System Safe monitoring of critical cooling circuits, Endress Hauser, https://portal.endress.com/wa001/dla/5000232/1505/000/01/IN00012SEN 04 EN 02.15.pdf, accessed Jan. 20, 2022.
(Continued)

*Primary Examiner* — Mohammad K Islam
(74) *Attorney, Agent, or Firm* — Holtz, Holtz & Volek PC

(57) ABSTRACT

According to one embodiment, a monitoring apparatus includes a processing circuit. The processing circuit is configured to generate second data including a prediction value of a second sensor correlated with a first sensor from first data including a measurement value of the first sensor of which a measurement value changes suddenly in a case where the control signal changes, detect an anomaly of the system or an anomaly of at least one sensor, and make it difficult to detect the anomaly in a case where the determination signal indicates that there is a change in the control signal.

15 Claims, 12 Drawing Sheets

(56) References Cited

U.S. PATENT DOCUMENTS

| | | | |
|---|---|---|---|
| 2014/0149806 A1 | 5/2014 | Khalastchi et al. | |
| 2015/0363925 A1* | 12/2015 | Shibuya | G06V 10/761 345/440 |
| 2019/0091761 A1* | 3/2019 | Browne, III | B22D 11/16 |
| 2021/0065023 A1 | 3/2021 | Naito et al. | |
| 2021/0356943 A1 | 11/2021 | Taguchi et al. | |
| 2022/0137611 A1 | 5/2022 | Naito et al. | |

FOREIGN PATENT DOCUMENTS

| | | | |
|---|---|---|---|
| JP | 6701917 B2 | 5/2020 | |
| JP | 2021033705 A | 3/2021 | |
| JP | 2021179740 A | 11/2021 | |
| JP | 2022074890 | 5/2022 | |

OTHER PUBLICATIONS

U.S. Appl. No. 17/463,016; First Named Inventor: Susumu Naito; Title: "Abnormality Determination Apparatus, Learning Apparatus and Abnormality Determination Method"; filed Aug. 31, 2021.

* cited by examiner

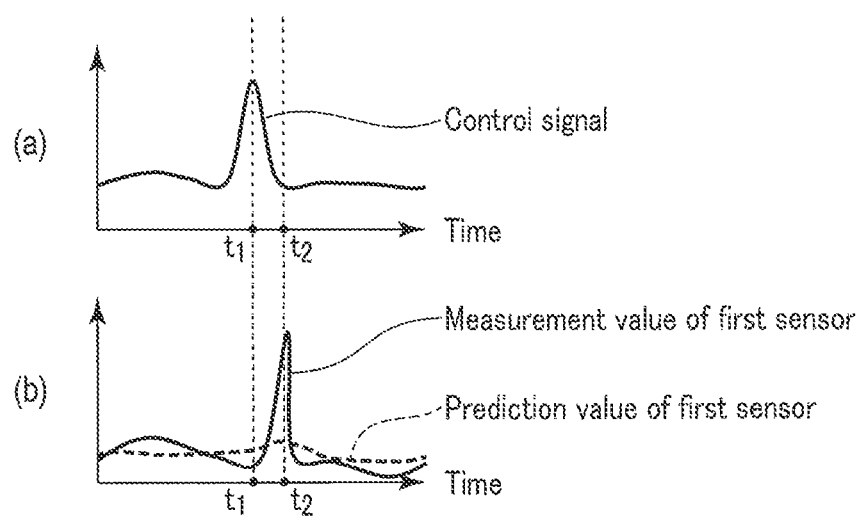
F I G. 5

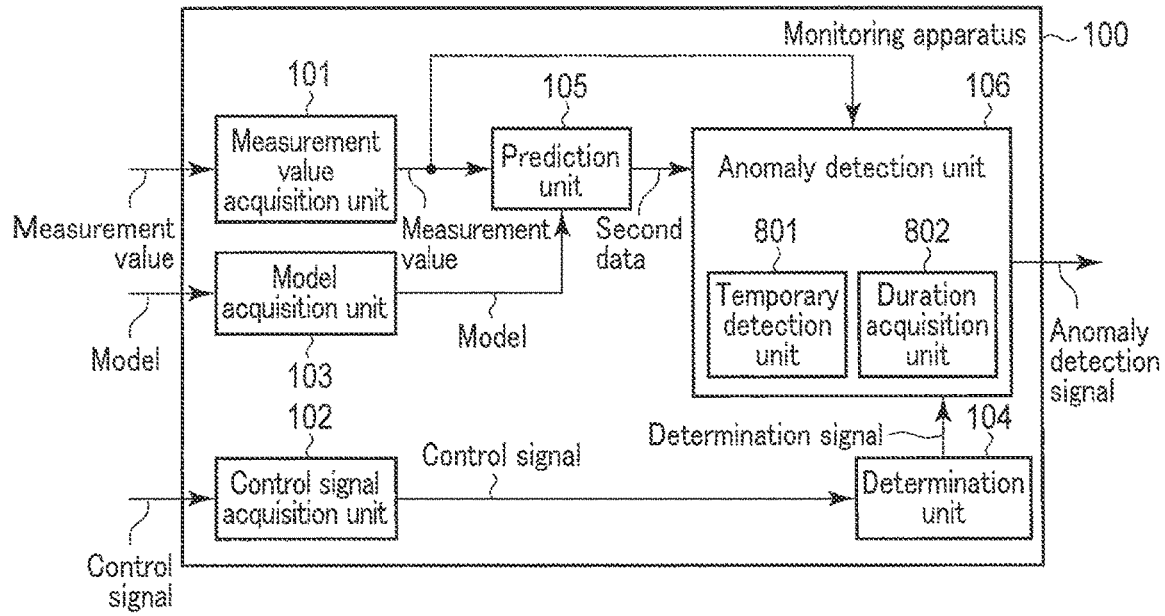

FIG. 8

|  | No change in control signal | Change in control signal |
|---|---|---|
| Short duration of threshold excess | (a) Not execute control to make it difficult to detect anomaly | (b) Execute control to make it difficult to detect anomaly |
| Long duration of threshold excess | (c) Not execute control to make it difficult to detect anomaly | (d) Not execute control to make it difficult to detect anomaly |

FIG. 9

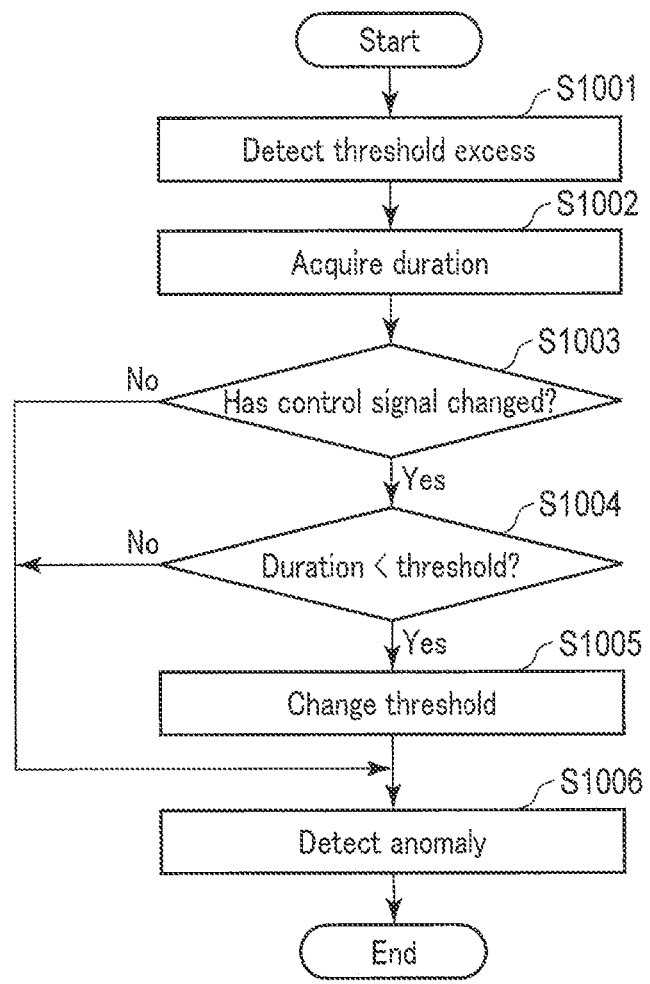
F I G. 10

|  | No change in control signal | Change in control signal |
|---|---|---|
| Duration of threshold excess shorter than predetermined time R' | (a) Execute control to make it difficult to detect anomaly | (b) Execute control to make it difficult to detect anomaly |
| Duration of threshold excess equal to or longer than predetermined time R' and shorter than R | (c) Not execute control to make it difficult to detect anomaly | (d) Execute control to make it difficult to detect anomaly |
| Duration of threshold excess equal to or longer than predetermined time R | (e) Not execute control to make it difficult to detect anomaly | (f) Not execute control to make it difficult to detect anomaly |

FIG. 11

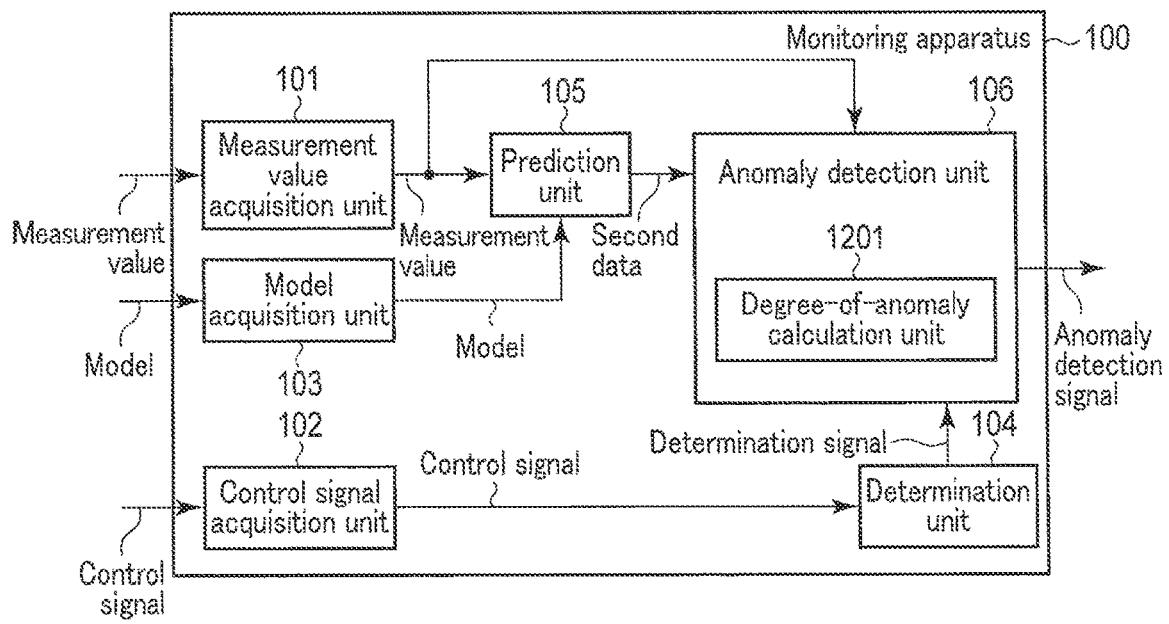

FIG. 12

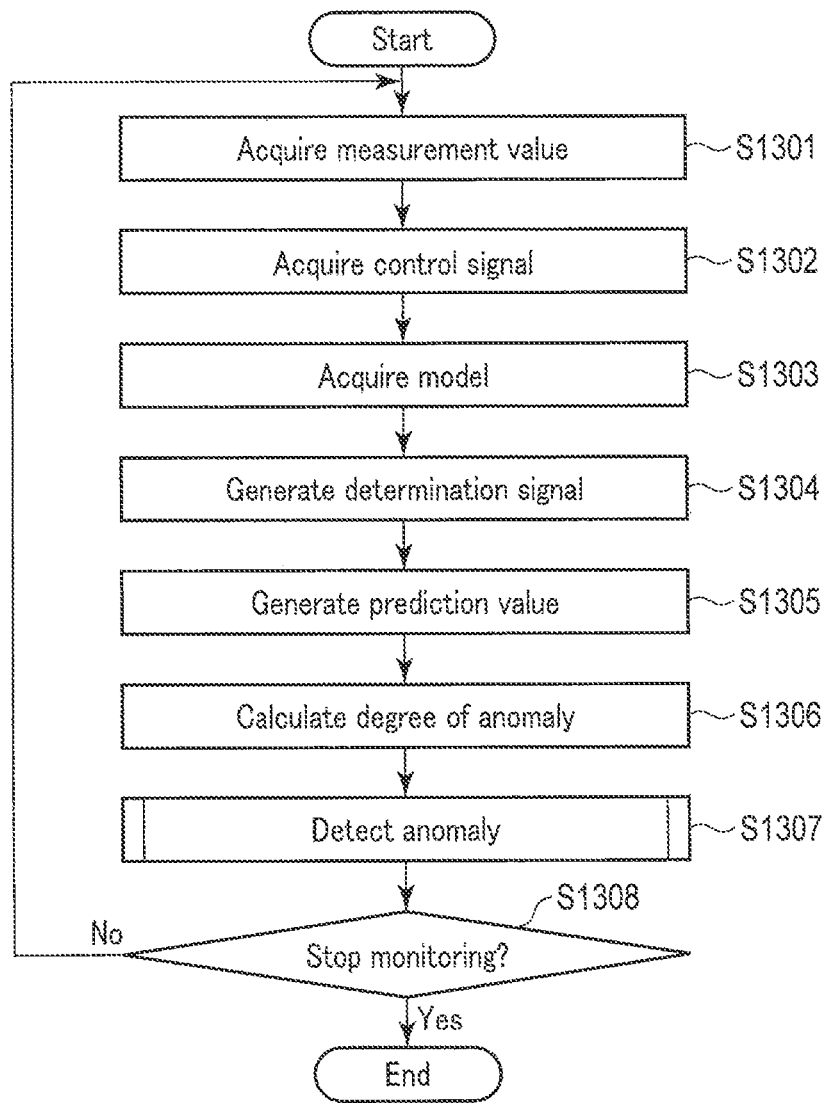
F I G. 13

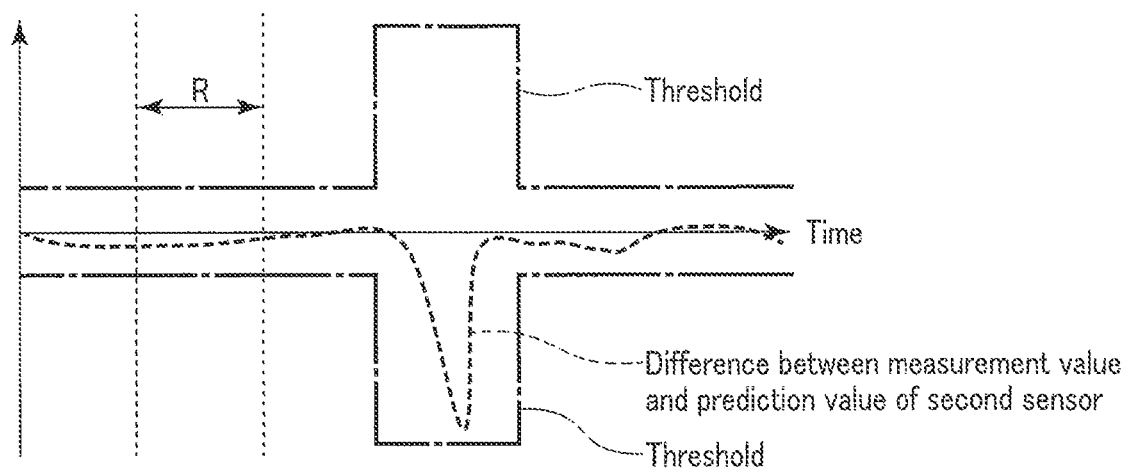
F I G. 16

MONITORING APPARATUS, METHOD, AND PROGRAM

CROSS-REFERENCE TO RELATED APPLICATIONS

This application is based upon and claims the benefit of priority from Japanese Patent Application No. 2021-150380, filed Sep. 15, 2021, the entire contents of which are incorporated herein by reference.

FIELD

Embodiments described herein relate generally to a monitoring apparatus, a method, and a program.

BACKGROUND

An infrastructure system used in a power plant, a water treatment plant, or the like, or a system used in a manufacturing apparatus includes a plurality of devices. In a case where the infrastructure system stops, the social function may be adversely affected. In addition, in a case where the system of the manufacturing apparatus stops, economic loss may occur. Therefore, it is important to keep these systems in a sound state.

Such systems are generally controlled using feedback control, feedforward control, or a derivative of these control methods so that measurement values of system outputs approach target values. In addition, in a case where the system is large-scale, the system includes a plurality of subsystems, and each subsystem is controlled by feedback control or feedforward control. For this reason, control is complicated in a large-scale system.

It is necessary to monitor the system in order to prevent failures of the system in advance or to recover the system as soon as possible after the failure. In order to monitor the system, a plurality of sensors is installed at various places in the system. Then, the state of the system can be monitored by monitoring the values of the sensors installed in the system. In addition, in a case where the system is large-scale or in a case where the system is complicated, the number of sensors required for monitoring the system increases. In this case, it is difficult to simultaneously monitor all the sensors with a limited number of people.

In order to handle such a case, there has been known a monitoring apparatus that assists or automates monitoring of a system using measurement values of sensors. Such a monitoring apparatus is required to suppress an erroneous detection in which an anomaly is erroneously detected although the system is normal.

BRIEF DESCRIPTION OF THE DRAWINGS

FIG. 5 is diagram for explaining a state where an erroneous detection occurs due to a shortage of training data during model training;

FIG. 8 is a diagram showing an example of a configuration of a monitoring apparatus according to a first modification;

FIG. 9 is a table showing an example of classification in anomaly detection control by the monitoring apparatus according to the first modification;

FIG. 10 is a flowchart showing a processing procedure of an anomaly detection process performed by the monitoring apparatus according to the first modification;

FIG. 11 is a table showing another example of classification in the anomaly detection control by the monitoring apparatus according to the first modification;

FIG. 12 is a diagram showing an example of a configuration of a monitoring apparatus according to a second modification;

FIG. 13 is a flowchart showing a processing procedure of a monitoring process performed by the monitoring apparatus according to the second modification;

FIG. 16 is a diagram showing an example of a display screen that displays a threshold for an excess time.

DETAILED DESCRIPTION

In general, according to one embodiment, a monitoring apparatus includes a processing circuit. The processing circuit is configured to acquire measurement values of sensors installed in a system, acquire a control signal from the system, acquire a model that generates second data including a prediction value of each of sensors belonging to a second sensor set including, as an element, a second sensor correlated with a first sensor when first data is input, the first data including a measurement value of each of sensors belonging to a first sensor set including, as an element, the first sensor of which a measurement value changes suddenly in a case where the control signal changes during a predetermined operation mode, generate a determination signal by determining a change in the control signal, generate the second data including a prediction value of each of the sensors belonging to the second sensor set from the first data included in the measurement value and the model, and detect an anomaly of the system or an anomaly of at least one sensor belonging to the second sensor set based on a measurement value of each of the sensors belonging to the second sensor set, the second data, the determination signal, and a threshold. The processing circuit makes it difficult to detect the anomaly in a case where the determination signal indicates that there is a change in the control signal.

Hereinafter, embodiments of a monitoring apparatus, a method, and a program will be described in detail with reference to the drawings. In the following description,

First Embodiment

Figure 1:
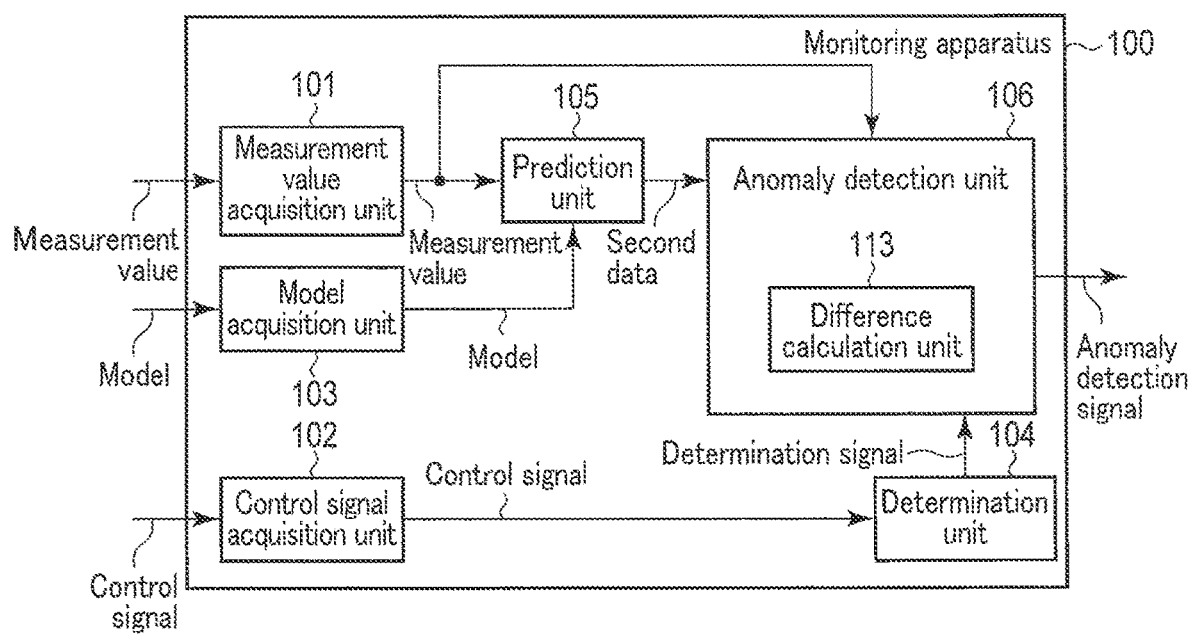
FIG. 1 is a diagram showing an example of a configuration of a monitoring apparatus according to a first embodiment.

FIG. 1 is a diagram showing an example of a configuration of a monitoring apparatus 100 according to a first embodiment. The monitoring apparatus 100 is connected to a system to be monitored via a network or the like. The monitoring apparatus 100 acquires measurement values measured every moment by a plurality of sensors installed in the system to be monitored, and detects an anomaly in the system. The monitoring apparatus 100 then outputs a signal indicating an anomaly detection result to the outside such as a display.

The network is, for example, a local area network (LAN). Note that the connection to the network can be a wired connection or a wireless connection. Furthermore, the network is not limited to the LAN, and can be the Internet, a public communication line, or the like.

The monitoring apparatus 100 includes a processing circuit that controls the entire monitoring apparatus 100 and a storage medium (a memory). The processing circuit is a processor that performs the functions of a measurement value acquisition unit 101, a control signal acquisition unit 102, a model acquisition unit 103, a determination unit 104, a prediction unit 105, and an anomaly detection unit 106 by calling and executing a program in the storage medium. The processing circuit includes an integrated circuit including a central processing unit (CPU), an application specific integrated circuit (ASIC), a field programmable gate array (FPGA), or the like. The processor can include one integrated circuit, or can include a plurality of integrated circuits.

The storage medium stores a processing program used in the processor, parameters and tables used in calculation in the processor, and the like. The storage medium is a storage device such as a hard disk drive (HDD), a solid state drive (SSD), or an integrated circuit that stores various types of information. Furthermore, the storage device can be a portable storage medium such as a compact disc (CD), a digital versatile disc (DVD), or a flash memory in addition to an HDD, an SSD, or the like, or can be a drive device that reads and writes various types of information from and to a semiconductor memory element or the like such as a flash memory or a random access memory (RAM).

Note that the functions of the measurement value acquisition unit 101, the control signal acquisition unit 102, the model acquisition unit 103, the determination unit 104, the prediction unit 105, and the anomaly detection unit 106 can be implemented by a single processing circuit, or can be implemented by combining a plurality of independent processors to form a processing circuit and executing a program by each processor. Furthermore, the functions of the measurement value acquisition unit 101, the control signal acquisition unit 102, the model acquisition unit 103, the determination unit 104, the prediction unit 105, and the anomaly detection unit 106 can be implemented as individual hardware circuits.

The measurement value acquisition unit 101 acquires information (hereinafter, referred to as "measurement value data") including a measurement value of each sensor installed in the system to be monitored. The measurement value data is time-series data measured every moment by a plurality of sensors installed in the system to be monitored. The acquisition interval of the measurement value data is preferably determined depending on the sampling interval of the sensor and the processing speed of the monitoring apparatus 100. The acquisition interval of the measurement value data is, for example, one minute, ten minutes, or the like.

The control signal acquisition unit 102 acquires a control signal of the system to be monitored in a predetermined operation mode. The present embodiment will describe a case where one specific control signal that affects a sensor value is acquired, but a plurality of control signals can be acquired.

The operation mode is, for example, a mode of starting the system, a mode of stopping the system, a standby mode, a mode of performing a test operation, a mode of performing an operation at a predetermined load, a mode of performing an operation on the system, or the like.

As the control signal, for example, a feedback control signal, a feedforward control signal, a control signal with low correlation with a change in operation mode and with an irregular change, or the like is used. As the control signal, a signal that hardly changes during the predetermined operation mode can also be used.

Specifically, for example, a boiler input regulator (BIR) signal, a soot blower signal, a signal related to start and stop of a plurality of fuel apparatuses provided in the system, a signal indicating the number of starting fuel apparatuses provided in the system, a signal indicating switching of a fuel type, or the like is used as the control signal. The boiler input regulator (BIR) may also be called a boiler input rate (BIR) or a boiler input ratio (BIR).

The boiler input regulator (BIR) signal is an example of a feedforward control signal that compensates for a response delay of a boiler included in the system.

The soot blower removes soot and dust of devices in the system. The soot blower is used, for example, in a boiler. In many cases, the soot blower operates independently of the timing of a change in operation mode. The soot blower signal is an example of a control signal with low correlation with the change in operation mode and with an irregular change.

The system may include a fuel apparatus for operating the system. In addition, the number of fuel apparatuses is not limited to one, and a plurality of fuel apparatuses may be included. In a case where the system is operated at a predetermined load, the number of starting fuel apparatuses may change. In addition, even if the number of starting fuel apparatuses is the same, different fuel apparatuses may start. The signal indicating start and stop of the fuel apparatuses is an example of the control signal with low correlation with the change in operation mode and with an irregular change. Furthermore, the signal indicating the number of starting fuel apparatuses is also an example of the control signal with low correlation with the change in operation mode and with an irregular change.

There is not always one fuel for operating the system. If there is a plurality of fuels, the fuel may be switched even though the load of the system is constant. The signal for switching a fuel type is an example of the control signal with low correlation with the change in operation mode and with an irregular change.

The model acquisition unit 103 acquires a model. The model receives inputs of measurement values of one or more sensors provided in the system, and outputs a value (hereinafter, referred to as "prediction value") obtained by predicting a sensor value obtained in a normal state from a sensor with correlation with at least one of the one or more sensors corresponding to the input measurement values.

Here, data input to the model is referred to as "first data", and a set of sensors corresponding to the first data is referred to as "first sensor set". The first data includes measurement values of the first sensor set. In addition, data output from the model is referred to as "second data", and a set of sensors corresponding to the second data is referred to as "second sensor set". The second data includes prediction values of the second sensor set. That is, the model receives an input of first data including a measurement value of each sensor belonging to the first sensor set, and generates and outputs second data including a prediction value of each sensor belonging to the second sensor set.

The number of sensors belonging to the second sensor set can be equal to or different from the number of sensors belonging to the first sensor set. In addition, the sensors belonging to the first sensor set and the sensors belonging to the second sensor set can overlap or do not need to overlap.

In the system, a measurement value of a specific sensor may change after a certain control signal changes. For example, in a case where a change (hereinafter, referred to as "sudden change") occurs in a certain control signal in a manner that the signal value momentarily increases and then returns to approximately the original value or decreases and then returns to approximately the original value, the sudden change may also occur in the measurement value of the specific sensor. The sensors provided in the system include a sensor (hereinafter, referred to as "first sensor") of which the measurement value is likely to change suddenly due to a change in a specific control signal and a sensor of which the measurement value is unlikely to change suddenly due to the change in the specific control signal. In the description of the sudden change, it is described as "momentarily", but the time that can be regarded as "momentarily" changes depending on a system control method and a response time. The time that can be regarded as "momentarily" may be, for example, several seconds, several minutes, or about ten hours.

The sensor included in the first sensor set and the sensor included in the second sensor set are determined in advance depending on the type of the system to be monitored, the type of a control signal that can be acquired, and the type of a model to be used. Typically, the first sensor set includes a sensor corresponding to the first sensor. It is assumed in the present embodiment that the first sensor set includes the first sensor.

The sensors included in the second sensor set may include a sensor (hereinafter, referred to as "second sensor") of which the prediction value is likely to change in conjunction with a change in the measurement value of the first sensor included in the first sensor set when the sensor value is predicted using the model. The second sensor is a sensor with correlation with the first sensor. In addition, the second sensor is a sensor of which the measurement value is less likely to be affected by the change in the control signal than the first sensor. Typically, the second sensor set includes a sensor corresponding to the second sensor. It is assumed in the present embodiment that the second sensor set includes the second sensor.

Note that the first sensor set can include a sensor corresponding to the second sensor. Furthermore, the second sensor set can include a sensor corresponding to the first sensor. In addition, specific sensors belonging to the first sensor set and the second sensor set can correspond to both the first sensor and the second sensor. Moreover, a specific sensor corresponding to the first sensor or the second sensor can be included in both the first sensor set and the second sensor set.

The model is a machine learning model that has learned the correlation between the sensors using the history of the measurement values of the individual sensors belonging to the same system sensor group and with the correlation among the sensors provided in the system. The model is generated by machine learning using history data of measurement values of sensors belonging to the union of the first sensor set and the second sensor set.

That is, when the first data including the measurement values of the individual sensors belonging to the first sensor set that includes at least the first sensor as an element is input to the model, the model generates the second data including the prediction values of the individual sensors belonging to the second sensor set including one or more of the sensors installed in the system.

The model is a function generated by machine learning. The function is represented by f. The function f is generated by executing expression (1) using a machine learning method. E(g) in the expression (1) is represented by expression (2).

$$f = \underset{g}{\mathrm{argmin}} E(g) \qquad (1)$$

$$E(g) = \sum_{t \in T} \|g(x_t) - y_t\|^2 \qquad (2)$$

In the expressions (1) and (2), T represents a set of times of data used for training the model among the history data. t represents a time belonging to T. $x_t$ represents a vector in which measurement values at the time t of the individual sensors belonging to the first sensor set, or values obtained by normalizing or standardizing the measurement values are arranged. Since normalization and standardization are well-known methods, description thereof will be omitted. The present embodiment is effective even in a case where normalization or standardization is performed on the measurement value. That is, $x_t$ corresponds to the first data. $y_t$ represents a vector in which measurement values at the time t of the second sensors are arranged. g represents a function that returns a vector with the same dimension as $y_t$ when a vector with the same dimension as $x_t$ is input. $\|\bullet\|^2$ represents the norm of a vector. A set $\{x_t, y_t\}_{t \in T}$ of $x_t$ and $y_t$ is referred to as "training data".

Any method can be adopted as the machine learning method. The model is, for example, a model of a neural network including a deep neural network and an autoencoder. Alternatively, the model is a model of linear regression, ridge regression, Lasso regression, kernel regression, kernel ridge regression, support vector regression, decision tree regression, random forest regression, or the like.

The determination unit 104 generates a determination signal based on a control signal. The determination unit 104 transmits the generated determination signal to the anomaly detection unit 106. The determination signal is a signal indicating a determination result as to whether or not the control signal has changed in a period (hereinafter, referred to as "period of interest") from a time (hereinafter, referred to as "start time") before a determination reference time (hereinafter, referred to as "time of interest") by a predetermined time M to the time of interest. The predetermined time M corresponds to the length of the period of interest. The predetermined time M is stored in advance in a storage medium, for example. The predetermined time M is set depending on, for example, a time from when the control signal changes to when the measurement value of the first sensor changes suddenly. Specifically, for example, the determination unit 104 determines whether or not the control signal has changed more than a predetermined threshold during the period of interest from the start time to the time of interest, and generates a determination signal based on the determination result.

The amount of change of the control signal is, for example, the absolute value of a difference between values of the control signal at the time of interest and the start time. Alternatively, the accumulated value of differential values of the control signal from the start time to the time of interest can be used as the amount of change of the control signal. Alternatively, the accumulated value of absolute values of differential values of the control signal from the start time to the time of interest can be used as the amount of change of the control signal. In a case where a plurality of signals is used as the control signal, a determination signal can be generated for each of the signals included in the control signal.

The prediction unit 105 causes the model to output the second data by inputting the first data to the model. The second data includes prediction values of the individual sensors belonging to the second sensor set.

The second data is represented by the following expression (3). In the expression (3), ^ attached to $y_t$ is a hat symbol. Hereinafter, the symbol X with a hat symbol is denoted as "^X". In the expression (3), $\hat{y}_t$ represents the second data at the time t. $x_t$ represents the first data at the time t. f represents a function of the model.

$$\hat{y}_t = f(x_t) \quad (3)$$

The anomaly detection unit 106 detects an anomaly of a sensor belonging to the second sensor set based on the measurement value of each sensor belonging to the second sensor set included in the measurement value data, the determination signal, and the second data. The anomaly detection unit 106 then outputs an anomaly detection signal indicating the anomaly detection result to the outside of the monitoring apparatus 100.

Hereinafter, the anomaly detection unit 106 will be described in detail.

The anomaly detection unit 106 includes a difference calculation unit 113. The difference calculation unit 113 calculates the difference between a measurement value and a prediction value in at least one sensor belonging to the second sensor set.

The anomaly detection unit 106 determines the presence or absence of an anomaly in a sensor belonging to the second sensor set by performing a threshold determination on the difference between the measurement value and the prediction value or the absolute value thereof in the sensor. In a case where the threshold determination is performed on the difference between the measurement value and the prediction value, the anomaly detection unit 106 prepares an upper threshold and a lower threshold.

When performing the threshold determination, the anomaly detection unit 106 acquires a determination signal to acquire the presence or absence of the change in the control signal in the period of interest. In a case where the control signal changes in the period of interest, the anomaly detection unit 106 executes control to make it difficult to detect an anomaly in the period of interest. For example, in a case where the control signal changes in the period of interest, the anomaly detection unit 106 determines that no anomaly is detected in the period of interest, and sets a signal indicating that no anomaly is detected as the anomaly detection signal. Alternatively, in a case where the control signal changes in the period of interest, the anomaly detection unit 106 executes control so as not to detect an anomaly in the period of interest. Alternatively, the anomaly detection unit 106 sets the threshold for the threshold determination in the period of interest to infinity only in a case where the determination signal indicates a change in the control signal. Alternatively, the anomaly detection unit 106 sets the threshold for the threshold determination in the period of interest to be larger than thresholds at other times only in a case where the determination signal indicates a change in the control signal.

Figure 2:
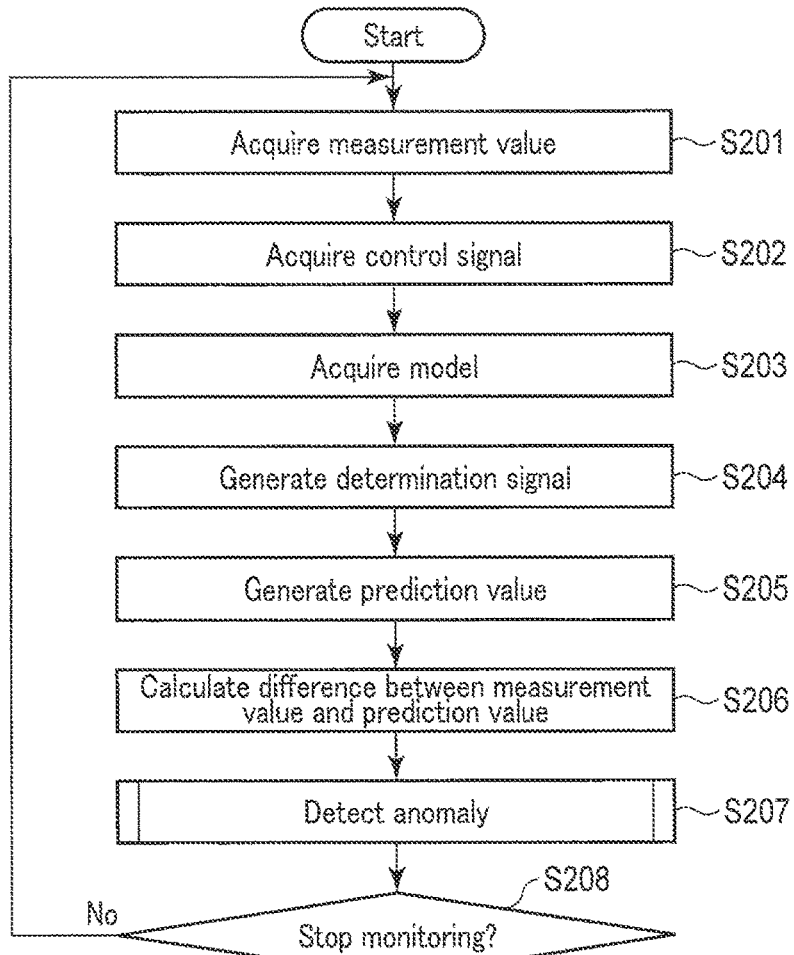
FIG. 2 is a flowchart showing a processing procedure of a monitoring process performed by the monitoring apparatus according to the first embodiment.

Next, an operation of a process performed by the monitoring apparatus 100 will be described. FIG. 2 is a flowchart showing an example of a procedure of a monitoring process. The monitoring process is a process of monitoring a system by detecting an anomaly in the system based on a sensor value obtained from a sensor installed in the system to be monitored. Note that the processing procedure in each process described below is merely an example, and each process can be appropriately changed as much as possible. Furthermore, in the processing procedure described below, it is possible to appropriately omit, replace, and add steps according to the embodiment.

(Monitoring Process)
(Step S201)

The measurement value acquisition unit 101 acquires measurement value data of a sensor from each of sensors installed in the system to be monitored. The measurement value data includes a measurement value of each sensor belonging to the union of the first sensor set and the second sensor set. The measurement value acquisition unit 101 transmits the acquired measurement value data to the prediction unit 105 and the anomaly detection unit 106.

(Step S202)

The control signal acquisition unit 102 acquires a control signal of the system to be monitored. The control signal acquisition unit 102 transmits the acquired control signal to the determination unit 104.

(Step S203)

The model acquisition unit 103 acquires a model from a storage medium provided inside the monitoring apparatus 100. The model acquisition unit 103 transmits the acquired model to the prediction unit 105.

(Step S204)

The determination unit 104 acquires the control signal and information related to a period of interest. Next, the determination unit 104 calculates the amount of change of the control signal in the period of interest, and determines whether or not the control signal has changed in the period of interest. If the amount of change of the control signal in the period of interest is larger than a predetermined value, the determination unit 104 sets the value of the determination signal to "1". On the other hand, if the amount of change is equal to or less than the predetermined value, determination unit 104 sets the value of the determination signal to "0". The determination unit 104 transmits the generated determination signal to the anomaly detection unit 106.

(Step S205)

The prediction unit 105 acquires the measurement value data and the model. The prediction unit 105 extracts a measurement value of each sensor belonging to the first sensor set from the measurement value data as first data, and inputs the extracted first data to the model. The model receives an input of the first data and outputs second data including a prediction value of the second sensor. The prediction unit 105 transmits the second data output from the model to the anomaly detection unit 106.

(Step S206)

The difference calculation unit 113 of the anomaly detection unit 106 acquires the measurement value data and the second data. The difference calculation unit 113 acquires a measurement value of each sensor belonging to the second sensor set from the measurement value data. The difference calculation unit 113 also extracts a prediction value of each sensor belonging to the second sensor set from the second data. The difference calculation unit 113 then calculates the difference between the measurement value and the prediction value in each sensor belonging to the second sensor set. The difference between the measurement value and the prediction value is calculated using, for example, the following expression (4) or (5).

$$d_{t,s} = y_{t,s} - \widehat{y_{t,s}} \quad (4)$$

$$d_{t,s} = \widehat{y_{t,s}} - y_{t,s} \quad (5)$$

In the expressions (4) and (5), $y_{t,s}$ represents a measurement value of a sensor. The subscript s represents the ID of the sensor. $\widehat{y_{t,s}}$ represents a prediction value of the sensor. $d_{t,s}$ represents a difference between the measurement value and the prediction value.

(Step S207)

The anomaly detection unit 106 acquires the difference between the measurement value and the prediction value and the determination signal. The anomaly detection unit 106 performs an anomaly detection process using the difference between the measurement value and the prediction value. The anomaly detection process is a process of detecting the presence or absence of an anomaly in each sensor belonging to the second sensor set. The anomaly detection unit 106 outputs an anomaly detection signal indicating an anomaly detection result to a management system that manages the system or an external display.

Figure 3:
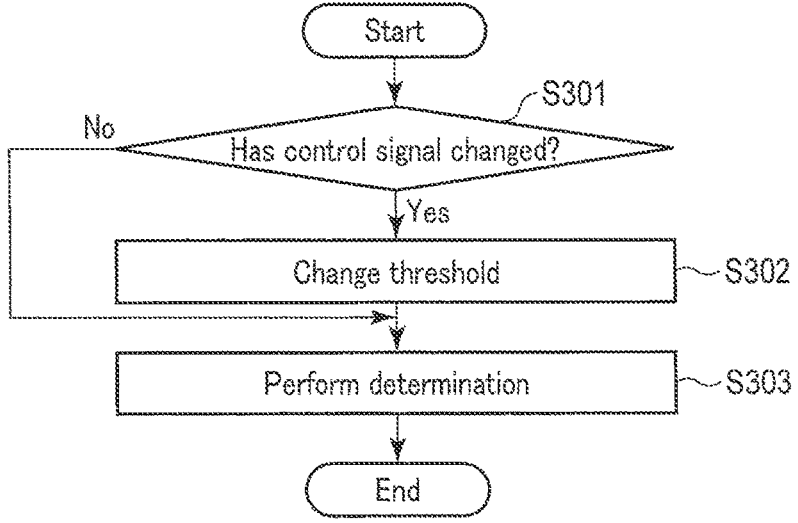
FIG. 3 is a flowchart showing a processing procedure of an anomaly detection process performed by the monitoring apparatus according to the first embodiment.

Here, the anomaly detection process performed in step S207 will be described. FIG. 3 is a flowchart showing an example of a procedure of the anomaly detection process. Note that the processing procedure in each process described below is merely an example, and each process can be appropriately changed as much as possible. Furthermore, in the processing procedure described below, it is possible to appropriately omit, replace, and add steps according to the embodiment.

(Anomaly Detection Process)

(Step S301)

The anomaly detection unit 106 determines the presence or absence of a change in the control signal in the period of interest based on the determination signal. For example, if "0" is acquired as the determination signal (step S301—No), the anomaly detection unit 106 determines that the control signal has not changed in the period of interest. For example, if "1" is acquired as the determination signal (step S301—Yes), the anomaly detection unit 106 determines that the control signal has changed in the period of interest.

(Step S302)

If the control signal has changed at the time of interest (step S301—Yes), the anomaly detection unit 106 changes the threshold in the period of interest. For example, the anomaly detection unit 106 sets the threshold in the period of interest to a value larger than the thresholds at other times. As a result, if the control signal changes in the period of interest, it is difficult to detect an anomaly.

(Step S303)

The anomaly detection unit 106 determines whether or not the absolute value of the difference between the measurement value and the prediction value is larger than a threshold in each sensor belonging to the second sensor set. For example, if the absolute value ($|d_{t,s}|$) of the difference between the measurement value and the prediction value is larger than the threshold, the anomaly detection unit 106 determines that there is an anomaly in the sensor. Furthermore, if the absolute value ($|d_{t,s}|$) of the difference between the measurement value and the prediction value is equal to or less than the threshold, the anomaly detection unit 106 determines that there is no anomaly in the sensor.

The anomaly detection unit 106 outputs an anomaly detection signal indicating an anomaly detection result to the outside. Thereafter, the monitoring apparatus 100 ends the anomaly detection process, and the process proceeds to step S208.

(Step S208)

The monitoring apparatus 100 determines whether or not an instruction to stop monitoring the system is input from an external system. If the instruction to stop monitoring the system is input (step S208—Yes), the monitoring apparatus 100 ends the monitoring process.

The monitoring apparatus 100 repeats the processes of steps S201 to S207 until the instruction to stop monitoring the system is input, thereby acquiring measurement value data measured every moment by a plurality of sensors installed in the system to be monitored and outputting the anomaly detection signal indicating the anomaly detection result to the outside.

Effects of First Embodiment

Hereinafter, effects of the monitoring apparatus 100 according to the present embodiment will be described.

In a case where the model adopting the machine learning method using the correlation between sensors belonging to the same system sensor group is used, an erroneous detection may occur due to the conjunction of the prediction value of the second sensor with the measurement value of the first sensor in conjunction with the change in the control signal, or an erroneous detection may occur due to a relative shortage in the training data in a scene where the measurement value of the first sensor changes suddenly in conjunction with the change in the control signal. Hereinafter, the effects of the present embodiment will be described after describing these two typical examples in which the erroneous detection occurs.

(Erroneous Detection Occurring by Conjunction of Prediction Value of Second Sensor with Measurement Value of First Sensor)

First, the erroneous detection that occurs due to the conjunction of the prediction value of the second sensor included in the second sensor set with the measurement value of the first sensor included in the first sensor set will be described. Here, for simplification of the description, it is assumed that the first sensor refers to the first sensor included in the first sensor set, and the second sensor refers to the second sensor included in the second sensor set.

In the system, the change in the control signal during a predetermined operation mode is a normal behavior. For example, during the predetermined operation mode, there may occur a sudden change in which the control signal greatly changes in a short period and then returns to the original state.

Figure 4:
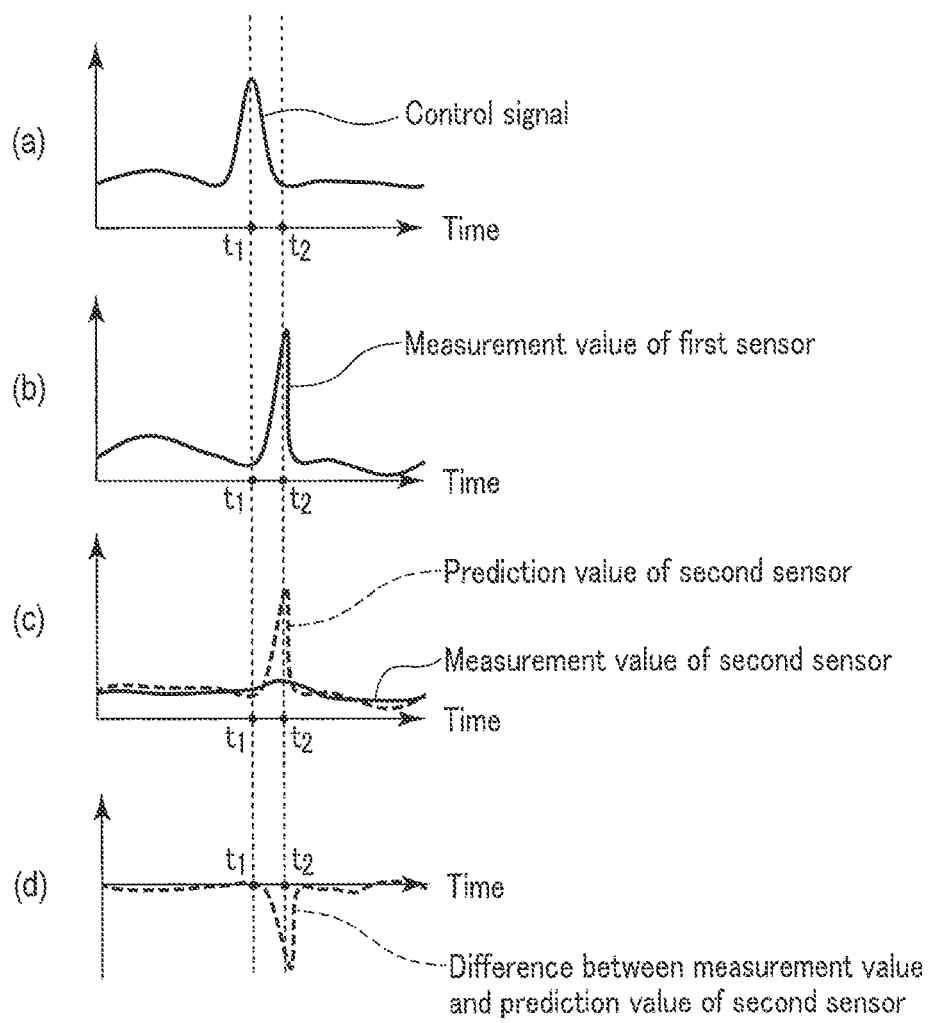
FIG. 4 is diagram for explaining a state where an erroneous detection occurs due to a conjunction of a measurement value of a second sensor with a prediction value of a first sensor.

FIG. 4 is diagram for explaining a state where an erroneous detection occurs due to the conjunction of the prediction value of the second sensor with the measurement value of the first sensor. FIG. 4(a) is a diagram showing an example of a state where a control signal changes suddenly.

The horizontal axis in FIG. 4(a) represents a time. The vertical axis in FIG. 4(a) represents a value of the control signal. In FIG. 4(a), the control signal changes suddenly around a time $t_1$. The control signal increases around the time $t_1$ and then returns to the value before the change around a time $t_2$.

Furthermore, in the system, the change in a measurement value of a specific sensor after the change in the control signal is a normal behavior. In many cases, feedback control, feedforward control, or the like is executed so that the sudden change in a measurement value of a sensor in the device to be controlled is suppressed as much as possible, but it is not always possible to completely suppress the sudden change. In addition, in a case where the system includes a plurality of subsystems, even if the sudden change in a measurement value of a sensor in a certain subsystem is suppressed to some extent, the change in a measurement value of a sensor not included in the subsystem is not necessarily suppressed. For example, in a case where a control signal of an upstream subsystem changes, even if the sudden change in a measurement value of a sensor in the subsystem is suppressed to some extent, a sudden change may occur in a measurement value of a sensor in a subsystem downstream of the subsystem. For this reason, in a case where the system is large-scale and complicated, there are many sensors in which the measurement value suddenly changes due to the change in the control signal. The first sensor is a sensor of which the measurement value changes suddenly due to the change in the control signal. Accordingly, the measurement value of the first sensor changes in conjunction with the change in the control signal.

FIG. 4(b) is a diagram showing an example of a measurement value of the first sensor in a case where the control signal changes suddenly as shown in FIG. 4(a). The horizontal axis in FIG. 4(b) represents a time synchronized with the horizontal axis in FIG. 4(a). The vertical axis in FIG. 4(b) represents a value of the first sensor. In FIG. 4(b), the measurement value of the first sensor increases around the time $t_2$ after the time $t_1$, and then returns to the value before the change. Therefore, the measurement value of the first sensor changes suddenly in conjunction with the change in the control signal.

The prediction value of the second sensor included in the second sensor set is generated by referring to the measurement value of the first sensor included in the first sensor set. As described above, the second data including the prediction value of the second sensor included in the second sensor set is calculated using, for example, the expression (3). As can be seen from the expression (3), variables of the expression for calculating the prediction value of the second sensor include the measurement value of the first sensor. Therefore, when the model using the expression (3) is adopted, the prediction value of the second sensor included in the second sensor set changes in conjunction with the change in the measurement value of the first sensor included in the first sensor set. Meanwhile, the second sensor is less likely to be affected by the change in the control signal than the first sensor. For this reason, the measurement value of the second sensor is not made in conjunction with the change in the control signal and does not change greatly as compared with the measurement value of the first sensor.

FIG. 4(c) is a diagram showing an example of a prediction value and a measurement value of the second sensor included in the second sensor set in a case where the measurement value of the first sensor changes as shown in FIG. 4(b). The broken line in FIG. 4(c) indicates the prediction value of the second sensor. The solid line in FIG. 4(c) indicates the measurement value of the second sensor. The horizontal axis in FIG. 4(c) represents a time synchronized with the horizontal axes in FIGS. 4(a) and 4(b). The vertical axis in FIG. 4(c) represents a value of the second sensor. In FIG. 4(c), the amount of change of the measurement value of the second sensor near the time $t_2$ is smaller than the amount of change of the measurement value of the first sensor at the time $t_2$. That is, the measurement value of the second sensor does not change greatly even in a case where the control signal changes suddenly. On the other hand, the prediction value of the second sensor increases around the time $t_2$ after the time $t_1$, and then returns to the value before the change. Therefore, the prediction value of the second sensor changes suddenly in conjunction with the change in the measurement value of the first sensor. That is, the prediction value of the second sensor also changes suddenly in conjunction with the change in the control signal.

FIG. 4(d) is a diagram showing an example of the difference between a prediction value and a measurement value of the second sensor in a case where the prediction value and the measurement value of the second sensor change as shown in FIG. 4(c). The horizontal axis in FIG. 4(d) represents a time synchronized with the horizontal axes in FIGS. 4(a), 4(b), and 4(c). The vertical axis in FIG. 4(d) represents the value of the difference between the prediction value and the measurement value of the second sensor. This difference is an example of the difference represented by the expression (4). In FIG. 4(d), the difference between the prediction value and the measurement value of the second sensor increases around the time $t_2$, and then returns to the value before the change. Therefore, the difference between the prediction value and the measurement value of the second sensor also changes suddenly in conjunction with the change in the control signal.

As described above, the measurement value of the first sensor changes suddenly due to the sudden change in the control signal, and the prediction value of the second sensor changes suddenly in conjunction with the change in the measurement value of the first sensor. Accordingly, the prediction value of the second sensor also changes suddenly in conjunction with the change in the control signal. On the other hand, the measurement value of the second sensor does not change greatly due to the change in the control signal and the change in the measurement value of the first sensor. Therefore, the difference between the measurement value and the prediction value of the second sensor also changes suddenly in conjunction with the change in the control signal.

In a case where the absolute value of the difference between the prediction value and the measurement value of the second sensor exceeds a threshold, it is determined in the anomaly detection process that the second sensor has an anomaly. For this reason, in a case where the control signal changes suddenly, there is a high possibility that an erroneous detection occurs in which the second sensor is detected as anomalous, although the behavior of the measurement value of the second sensor is normal. As described above, in a case where an anomaly detection is performed by utilizing a model using the correlation between sensors, an erroneous detection may occur in which the prediction value of the second sensor changes suddenly when the control signal changes due to the conjunction of the measurement value of the first sensor with the prediction value of the second sensor, so that the second sensor or its sensing target is determined to be anomalous even though the second sensor or its sensing target is normal.

(Erroneous Detection Due to Relative Shortage of Training Data in Model Training)

Next, the erroneous detection due to a shortage of training data in model training will be described. In a case where the first sensor is included in the second sensor set, an erroneous detection may occur due to a shortage of training data in model training.

In a system in which stability is required, the number of scenes where the control signal changes or the measurement value of the first sensor changes suddenly is not so many. For this reason, the amount of data at the time when the measurement value of the first sensor changes suddenly due to the change in the control signal is relatively small in model training data. Furthermore, in order to minimize E(g) described above, data with a low appearance frequency is relatively ignored in model machine learning. For this reason, the model tends to be trained to generate prediction values similar to data with a high appearance frequency.

Accordingly, in a case where the prediction value of each sensor belonging to the second sensor set including the first sensor is calculated using the model, the prediction value of the first sensor often does not change in conjunction with the change in the control signal as compared with the measurement value. For this reason, the change width of the prediction value of the first sensor at the time when the control signal changes is often smaller than the change width of the measurement value of the first sensor.

FIG. 5 is diagram for explaining a state where an erroneous detection occurs due to a shortage of training data during model training. FIG. 5(a) is a diagram showing an example of a state where a control signal changes suddenly. The horizontal axis in FIG. 5(a) represents a time. The vertical axis in FIG. 5(a) represents a value of the control signal. In FIG. 5(a), the control signal changes suddenly around the time $t_1$. The control signal increases around the time $t_1$ and then returns to the value before the change around the time $t_2$.

FIG. 5(b) is a diagram showing an example of a measurement value and a prediction value of the first sensor in a case where the control signal changes suddenly as shown in FIG. 5(a). The broken line in FIG. 5(b) indicates the prediction value of the first sensor. The solid line in FIG. 5(b) indicates the measurement value of the first sensor. The horizontal axis in FIG. 5(b) represents a time synchronized with the horizontal axis in FIG. 5(a). The vertical axis in FIG. 5(b) represents a value of the first sensor. In FIG. 5(b), the measurement value of the first sensor also changes suddenly in conjunction with the change in the control signal. On the other hand, the prediction value of the first sensor does not change greatly around the time $t_2$ as compared with the measurement value.

In this manner, the measurement value of the first sensor changes suddenly due to the sudden change in the control signal. On the other hand, the prediction value of the first sensor does not change greatly even if the control signal changes. Accordingly, regardless of the presence or absence of anomaly of the first sensor, the absolute value of the difference between the measurement value of the first sensor and the prediction value of the first sensor around the time when the control signal changes is larger than that at other times. In a case where the difference between the prediction value and the measurement value of the first sensor exceeds a threshold, it is determined in the anomaly detection process that the first sensor has an anomaly. For this reason, in a case where the control signal changes suddenly, there is a high possibility that an erroneous detection occurs in which the first sensor is detected as anomalous, although the behavior of the measurement value of the first sensor is normal. As described above, in a case where an anomaly detection is performed by utilizing a model using the correlation between sensors, an erroneous detection may occur in which the absolute value of the difference between the prediction value and the measurement value of the first sensor increases when the control signal changes due to a relative shortage of training data, so that the first sensor or its sensing target is determined to be anomalous although the first sensor or its sensing target is normal.

As described above, an erroneous detection may occur due to the conjunction of the prediction value of the second sensor with the measurement value of the first sensor or a relative shortage of training data. For such an erroneous detection, for example, it is impossible to suppress an erroneous detection due to the change in the control signal during the operation mode by a method of determining a threshold for each operation mode determined depending on a load. In addition, it is impossible to suppress the erroneous detection by a method of controlling the threshold depending on the number of erroneous detections or non-detections within a certain period.

On the other hand, the monitoring apparatus 100 according to the present embodiment can acquire measurement value data from a plurality of sensors including the first sensor and the second sensor, acquire, from a system, a control signal that causes a sudden change in a measurement value of the first sensor when changing in a predetermined operation mode, acquire a model that generates, when first data including a measurement value of each sensor belonging to a first sensor set including the first sensor as an element is input, second data including a prediction value of each sensor belonging to a second sensor set including the second sensor as an element, generate a determination signal by determining a change in the control signal in a period of interest, generate second data from the first data included in the measurement value data and the model, and detect an anomaly of at least one sensor belonging to the second sensor set based on the measurement value of each sensor belonging to the second sensor set, the second data, the determination signal, and a predetermined threshold. In addition, in a case where the determination signal indicates the change in the control signal, the monitoring apparatus 100 can make it difficult to detect an anomaly as compared with a case where the determination signal indicates that no change is detected.

The control signal includes, for example, any one of a feedback control signal, a feedforward control signal, and a control signal with low correlation with a change in the operation mode and with an irregular change. Furthermore, the control signal includes, for example, any one of a boiler input regulator signal, a soot blower signal, a signal related to start and stop of a fuel apparatus, a signal indicating the number of starting fuel apparatuses, and a signal indicating switching of a fuel type.

For example, in a case where the determination signal indicates the change in the control signal, the monitoring apparatus 100 makes it difficult to detect an anomaly by determining that no anomaly is detected. Alternatively, the monitoring apparatus 100 makes it difficult to detect an anomaly by changing the threshold depending on the value of the determination signal. In this case, for example, by increasing the threshold in the period in which the control signal changes, the anomaly is difficult to be detected. The control to make it difficult to detect an anomaly is preferably executed on a predetermined sensor. The predetermined sensor can be all the sensors included in the second sensor set, or can be limited to the second sensor among the sensors included in the second sensor set. The predetermined sensor can be limited to, for example, the first sensor included in the second sensor set. The predetermined sensor can be limited to, for example, the first sensor and the second sensor included in the second sensor set.

Figure 6:
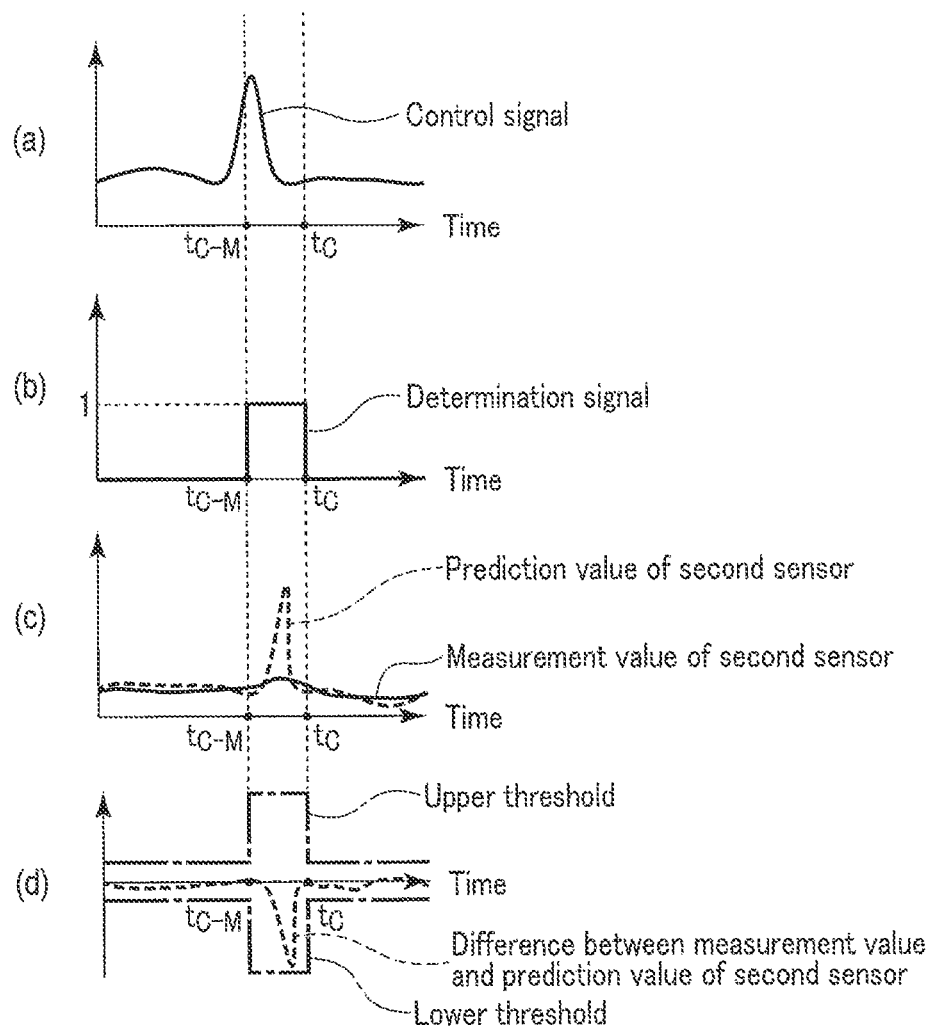
FIG. 6 is diagram for explaining a method of suppressing the erroneous detection due to the conjunction of the measurement value of the second sensor with the prediction value of the first sensor by the monitoring apparatus according to the first embodiment.

FIG. 6 is diagram for explaining a method of suppressing the erroneous detection due to the conjunction of the measurement value of the second sensor with the prediction value of the first sensor by making it difficult to detect an anomaly in the period in which the control signal changes. FIG. 6(a) is a diagram showing an example of a state where the control signal changes suddenly. The horizontal axis in FIG. 6(a) represents a time. The vertical axis in FIG. 6(a) represents a value of the control signal. Here, the time of interest is denoted as $t_C$, and the start time before the time of interest $t_C$ by a predetermined time M is denoted as $t_{C-M}$. In FIG. 6(a), the control signal changes in the period of interest between the time of interest $t_C$ and the start time $t_{C-M}$.

FIG. 6(b) is a diagram showing an example of a determination signal in a case where the control signal changes suddenly as shown in FIG. 6(a). The horizontal axis in FIG. 6(b) represents a time synchronized with the horizontal axis in FIG. 6(a). The vertical axis in FIG. 6(b) represents a value of the determination signal. In FIG. 6(b), the determination signal is "0" at a time other than the period of interest. In addition, in the period of interest, it is determined that the control signal has changed, and the determination signal is "1".

FIG. 6(c) is a diagram showing an example of a measurement value and a prediction value of the second sensor in a case where the control signal changes suddenly as shown in FIG. 6(a). The horizontal axis in FIG. 6(c) represents a time synchronized with the horizontal axes in FIGS. 6(a) and 6(b). The vertical axis in FIG. 6(c) represents a value of the second sensor. The broken line in FIG. 6(c) indicates the prediction value of the second sensor. The solid line in FIG. 6(c) indicates the measurement value of the second sensor. Furthermore, FIG. 6(d) is a diagram showing an example of the difference between the measurement value and the prediction value of the second sensor in a case where the control signal changes suddenly as shown in FIG. 6(a). The difference indicated by the broken line in FIG. 6(d) is an example of the difference represented by the expression (4). In FIG. 6(c), the prediction value of the second sensor changes suddenly in conjunction with the change in the control signal in the period of interest. For this reason, in FIG. 6(d), the difference between the measurement value and the prediction value of the second sensor also changes suddenly in the period of interest.

In addition, alternate long and short dash lines in FIG. 6(d) indicate an upper threshold and a lower threshold for the difference between the measurement value and the prediction value of the second sensor. As shown in FIG. 6(d), the monitoring apparatus 100 determines that the control signal has changed in the period of interest based on the determination signal being "1" in the period of interest, and sets the upper threshold in the period of interest to be larger than those at other times and the lower threshold to be less than those at other times. By increasing the upper threshold and reducing the lower threshold in the period of interest, even in a case where the difference between the measurement value and the prediction value of the second sensor changes suddenly although the second sensor and its sensing target are normal, the sudden change in the difference between the measurement value and the prediction value of the second sensor is less likely to exceed the upper threshold or fall below the lower threshold. For this reason, it is possible to suppress the erroneous detection in which it is determined as an anomaly in a case where the difference between the measurement value and the prediction value of the second sensor changes suddenly although the second sensor and its sensing target are normal.

Figure 7:
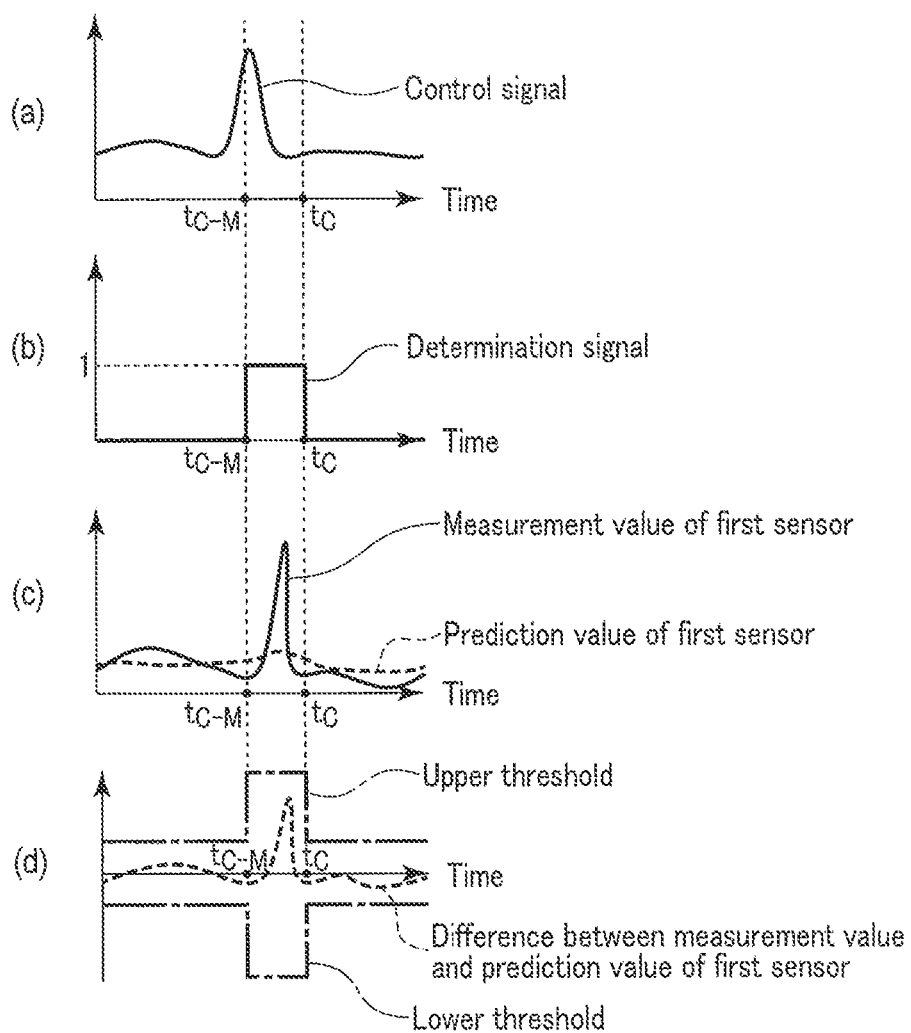
FIG. 7 is diagram for explaining a method of suppressing the erroneous detection due to the shortage of the training data during model training by the monitoring apparatus according to the first embodiment.

FIG. 7 is diagram for explaining a method of suppressing the erroneous detection due to a shortage of training data during model training by making it difficult to detect an anomaly in the period in which the control signal changes. FIG. 7(a) is a diagram showing an example of a state where the control signal changes suddenly. The horizontal axis in FIG. 7(a) represents a time. The vertical axis in FIG. 7(a) represents a value of the control signal. In FIG. 7(a), the control signal changes in the period of interest between the time of interest $t_C$ and the start time $t_{C-M}$.

FIG. 7(b) is a diagram showing an example of a determination signal in a case where the control signal changes suddenly as shown in FIG. 7(a). The horizontal axis in FIG. 7(b) represents a time synchronized with the horizontal axis in FIG. 7(a). The vertical axis in FIG. 7(b) represents a value of the determination signal. In FIG. 7(b), the determination signal is "0" at a time other than the period of interest. In addition, in the period of interest, it is determined that the control signal has changed, and the determination signal is "1".

FIG. 7(c) is a diagram showing an example of a measurement value and a prediction value of the first sensor in a case where the control signal changes suddenly as shown in FIG. 7(a). The horizontal axis in FIG. 7(c) represents a time synchronized with the horizontal axes in FIGS. 7(a) and 7(b). The vertical axis in FIG. 7(c) represents a value of the first sensor. The broken line in FIG. 7(c) indicates the prediction value of the first sensor. The solid line in FIG. 7(c) indicates the measurement value of the first sensor. In FIG. 7(c), the measurement value of the first sensor changes suddenly in conjunction with the change in the control signal in the period of interest.

Furthermore, FIG. 7(d) is a diagram showing an example of the difference between the measurement value and the prediction value of the first sensor in a case where the control signal changes suddenly as shown in FIG. 7(a). The broken line in FIG. 7(d) indicates the difference between the measurement value and the prediction value of the first sensor. This difference is an example of the difference represented by the expression (4). In FIG. 7(d), the difference between the measurement value and the prediction value of the first sensor also changes suddenly in the period of interest.

Alternate long and short dash lines in FIG. 7(d) indicate an upper threshold and a lower threshold for the difference between the measurement value and the prediction value of the first sensor. As shown in FIG. 7(d), the monitoring apparatus 100 determines that the control signal has changed in the period of interest based on the determination signal being "1" in the period of interest, and sets the upper threshold in the period of interest to be larger than those at other times and the lower threshold to be less than those at other times. As a result, even in a case where the measurement value of the first sensor changes suddenly although the first sensor and its sensing target are normal, the difference between the measurement value and the prediction value of the first sensor is less likely to exceed the upper threshold or fall below the lower threshold. For this reason, it is possible to suppress the erroneous detection in which it is determined as an anomaly in a case where the measurement value of the first sensor changes suddenly although the first sensor and its sensing target are normal.

As described above, according to the monitoring apparatus 100 of the present embodiment, in a case where the control signal changes and a sudden change occurs, a determination signal indicating that the control signal has changed is generated, and it is possible to execute control to make it difficult to detect an anomaly in a period in which the control signal has changed. As a result, even in a case where the absolute value of the difference between the measurement value and the prediction value of the first sensor or the second sensor increases due to the change in the control signal although the individual sensors and their sensing targets are normal, by executing control to make it difficult to detect an anomaly in a case where the determination signal changes, it is possible to suppress an erroneous detection in which an anomaly is erroneously detected.

Note that, as the determination signal, a signal indicating the amount of change of the control signal can be used instead of a signal indicating the presence or absence of the change in the control signal. In this case, an anomaly detection can be performed more flexibly. For example, as the amount of change of the control signal is larger, the threshold used for anomaly determination using the absolute value of the difference between the measurement value and the prediction value of each sensor is made larger. As a result, it is possible to make it more difficult to detect an anomaly as the amount of change of the control signal is larger.

In addition, the control is executed on all the sensors included in the second sensor set so that an anomaly is difficult to be detected when the control signal changes in the present embodiment, but the control can be executed only on some sensors included in the second sensor set so that an anomaly is difficult to be detected when the control signal changes. In this case, for example, in a case where the control signal changes, the anomaly detection unit 106 makes it difficult to detect an anomaly only in each sensor belonging to a third sensor set that is a subset of the second sensor set. The third sensor set includes only a sensor corresponding to the first sensor and a sensor corresponding to the second sensor among the sensors belonging to the second sensor set. Here, the first sensor and the second sensor are sensors of which the measurement value or prediction value changes suddenly in conjunction with the change in the control signal, and are sensors that may cause an erroneous detection. On the other hand, the measurement value or the prediction value of a sensor that does not correspond to either the first sensor or the second sensor among the sensors belonging to the second sensor set does not change in conjunction with the change in the control signal, and thus, such a sensor hardly causes an erroneous detection. In the present modification, it is possible to effectively suppress an erroneous detection by executing control to make it difficult to detect an anomaly only for a sensor which is likely to cause an erroneous detection.

Furthermore, the present embodiment has described a case where one type of signal is used as the control signal, but a plurality of types of control signals can be used. In this case, for each control signal, a set of sensors that may cause an erroneous detection due to the change in the control signal is set in advance. The control signal acquisition unit 102 acquires a plurality of control signals. The determination unit 104 determines the presence or absence of a change in each of the control signals during a predetermined operation mode. The anomaly detection unit 106 then executes control to make it difficult to detect an anomaly only in the sensor associated with the changed control signal. As a result, an anomaly detection can be performed more accurately.

(First Modification)

A first modification will be described. In the present modification, the configuration of the first embodiment is modified as follows. Description of configurations, operations, and effects similar to those of the first embodiment will be omitted. A monitoring apparatus 100 of the present modification is different from that of the first embodiment in that an anomaly detection is controlled using a duration of a threshold excess.

FIG. 8 is a diagram showing a configuration of the monitoring apparatus 100 according to the present modification. An anomaly detection unit 106 further includes a temporary detection unit 801 and a duration acquisition unit 802.

The temporary detection unit 801 temporarily detects a threshold excess in at least one sensor belonging to the second sensor set based on the measurement value of each sensor belonging to the second sensor set included in measurement value data and second data. For example, the temporary detection unit 801 detects the threshold excess by comparing the absolute value of the difference between a measurement value and a prediction value of a sensor belonging to the second sensor set with the threshold.

The duration acquisition unit 802 acquires the duration of the threshold excess in at least one sensor belonging to the second sensor set. For example, in a case where the processes of steps S201 to S207 in the monitoring process described above are performed over time at equal intervals, the number of times the absolute value of the difference between the measurement value and the prediction value of the sensor belonging to the second sensor set continuously exceeds the threshold is counted to acquire the duration of the threshold excess.

The anomaly detection unit 106 detects an anomaly of at least one sensor belonging to the second sensor set based on the measurement value of each sensor belonging to the second sensor set included in the measurement value data, the second data, the determination signal, the detection result of the threshold excess by the temporary detection unit 801, and the duration of the threshold excess acquired by the duration acquisition unit 802. The detection at this time follows the classification shown in FIG. 9, for example. FIG. 9 is a table showing an example of classification in anomaly detection control. In the case of (a) and (c) of FIG. 9, that is, in a case where the control signal does not change regardless of the duration of the threshold excess, the anomaly detection unit 106 determines that the threshold excess is not caused by the change in the control signal and that there is a possibility of an anomaly, and does not execute control to make it difficult to detect an anomaly. In the case of (b) of FIG. 9, that is, in a case where the control signal changes and the duration of the threshold excess is short, the anomaly detection unit 106 determines that the threshold excess is possibly a normal behavior in conjunction with the sudden change in the control signal, and executes control to make it difficult to detect an anomaly. In the case of (d) of FIG. 9, that is, in a case where the control signal changes and the duration of the threshold excess is long, the anomaly detection unit 106 determines that the threshold excess is not a normal behavior in conjunction with the sudden change in the control signal and is possibly caused by an anomaly to be detected, and does not execute control to make it difficult to detect an anomaly. In FIG. 9, whether the time of the threshold excess is long or short is determined based on, for example, whether the duration of the threshold excess is equal to or longer than a predetermined time R or shorter than the predetermined time R. The predetermined time R is stored in advance in a storage medium, for example. The predetermined time R is set depending on, for example, the length of the sudden change in a signal acquired as the control signal by the control signal acquisition unit 102.

Next, an operation of a process performed by the monitoring apparatus 100 will be described. FIG. 10 is a flowchart showing an example of a procedure of an anomaly detection process in a case where the anomaly detection unit 106 follows FIG. 9 and the method of executing control to make it difficult to detect an anomaly is changing a threshold. For each sensor belonging to the second sensor set, an anomaly detection signal is generated by the detection procedure shown in this flowchart. Hereinafter, the sensor to be processed is referred to as "sensor of interest". Note that the processing procedure in each process described below is merely an example, and each process can be appropriately changed as much as possible. Furthermore, in the processing procedure described below, it is possible to appropriately omit, replace, and add steps according to the embodiment.

(Anomaly Detection Process)

(Step S1001)

The temporary detection unit 801 temporarily determines whether or not the absolute value of the difference between a measurement value and a prediction value of the sensor of interest is larger than a threshold. The temporary detection unit 801 transmits the temporary detection result to the duration acquisition unit 802 as the temporary detection result.

(Step S1002)

The duration acquisition unit 802 acquires the temporary detection result related to the threshold excess of the sensor of interest. For example, the process in step S1001 is repeatedly performed at regular time intervals until monitoring is stopped. Accordingly, the duration acquisition unit 802 can calculate the duration of the threshold value excess of the sensor of interest by counting the number of threshold excesses in the process of step S1001.

(Step S1003)

The anomaly detection unit 106 determines the presence or absence of a change in the control signal in the period of interest based on the determination signal. For example, if "0" is acquired as the determination signal (step S1003—No), the anomaly detection unit 106 determines that the control signal does not change in the period of interest. On the other hand, if "1" is acquired as the determination signal (step S1003—Yes), the anomaly detection unit 106 determines that the control signal has changed in the period of interest. The process in this step is the same regardless of the sensor of interest as long as the period of interest is the same. Accordingly, in a case where the process in step S1003 is performed on a certain sensor of interest, the result of the process can be used for another sensor of interest.

(Step S1004)

In a case where the control signal has changed at the time of interest (step S1003—Yes), the anomaly detection unit 106 determines whether or not the duration of the threshold excess in the sensor of interest is shorter than the threshold. If the duration of the threshold excess in the sensor of interest is shorter than the threshold (step S1004—Yes), the anomaly detection unit 106 determines that the threshold excess possibly causes the sudden change in the control signal. On the other hand, if the duration of the threshold excess is equal to or longer than the threshold (step S1004—No), the anomaly detection unit 106 determines that the threshold excess does not cause the sudden change in the control signal.

(Step S1005)

If the duration of the threshold excess is shorter than the threshold (step S1004—Yes), the anomaly detection unit 106 determines that the threshold excess of the sensor of interest possibly causes the sudden change in the control signal, and sets the threshold for the sensor of interest in the period of interest to infinity. As a result, no anomaly is detected in the sensor of interest in the period of interest. At this time, the threshold can be set not to infinity but to a large value. In this case, an anomaly is difficult to be detected in the sensor of interest.

(Step S1006)

The anomaly detection unit 106 generates an anomaly detection signal by determining whether or not the absolute value of the difference between the measurement value and the prediction value of the sensor of interest exceeds the threshold, and outputs the anomaly detection signal to the outside of the monitoring apparatus 100. Here, the threshold is controlled in step S1005. As a result, no anomaly is detected in a sensor in which both steps S1003 and S1004 branch to Yes and the threshold is set to infinity in step S1005. In a case where the threshold is set not to infinite but to a large value in step S1005, an anomaly is difficult to be detected in the sensor of which the threshold is set to a large value.

Hereinafter, effects of the monitoring apparatus 100 according to the present modification will be described.

In a case where the threshold of the second sensor included in the second sensor set is exceeded due to the conjunction with the change in the control signal, there is a high possibility that the threshold excess time is short. On the other hand, in a case where the threshold excess time in the second sensor included in the second sensor set is long even if the control signal changes, there is a low possibility that the cause is the conjunction with the change in the control signal, and there is a high possibility that the cause is an anomaly to be detected. In a case where an anomaly is difficult to be detected due to the change in the control signal, a non-detection may occur in which the anomaly to be detected is missed.

The monitoring apparatus 100 according to the present modification can temporarily detect the threshold excess of at least one sensor belonging to the second sensor set based on the measurement value of each sensor belonging to the second sensor set, the second data, and the predetermined threshold, acquire the duration of the threshold excess, and in a case where the duration is shorter than the predetermined time and the determination signal indicates the change in the control signal, make it difficult to detect an anomaly as compared with a case where the determination signal indicates no change in the control signal.

With the configuration, according to the monitoring apparatus 100 of the present modification, it is possible to suppress a non-detection in which the anomaly to be detected is missed by executing control to make it difficult to detect an anomaly only when the control signal changes and the threshold excess time is short.

Note that, in the system, there are more control signals that cause a sudden change in the measurement value as the system is larger. Not all of these control signals can be acquired as control signals by the control signal acquisition unit 102. For example, in a case where a disturbance signal in which the sudden change is shorter than that of an acquirable control signal cannot be acquired as a control signal, it may be impossible to suppress an erroneous detection due to a sudden change in the first sensor in conjunction with a change in the disturbance signal and an erroneous detection due to the conjunction of a prediction value of the second sensor with the sudden change in the first sensor.

By using a plurality of values as the threshold for the threshold excess time, these erroneous detections can be suppressed. For example, in addition to the predetermined time R, a predetermined time R' shorter than the time R is used. In this case, the anomaly detection unit 106 follows FIG. 11 instead of FIG. 9, for example. FIG. 11 is a table showing an example of classification in anomaly detection control. In the case of (a) and (b) of FIG. 11, that is, in a case where the duration of the threshold excess is shorter than the time R', the anomaly detection unit 106 executes control to make it difficult to detect an anomaly regardless of the presence or absence of the change in the control signal. In the case of (c) of FIG. 11, that is, in a case where the duration of the threshold excess is equal to or longer than the time R' and shorter than the time R and the determination signal indicates no change in the control signal, the anomaly detection unit 106 does not execute the control to make it difficult to detect an anomaly. In the case of (d) of FIG. 11, that is, in a case where the duration of the threshold excess is equal to or longer than the time R' and shorter than the time R and the determination signal indicates the change in the control signal, the anomaly detection unit 106 executes the control to make it difficult to detect an anomaly. In the case of (e) and (f) of FIG. 11, that is, in a case where the duration of the threshold excess is equal to or longer than the time R, the anomaly detection unit 106 does not execute the control to make it difficult to detect an anomaly regardless of the presence or absence of the change in the control signal. By executing such control, in a case where the duration of a temporary detection is shorter than the predetermined time R', the control is executed to make it difficult to detect an anomaly regardless of the determination signal. As a result, it is also possible to suppress an erroneous detection due to a change in a disturbance signal or the like that cannot be acquired as the control signal.

(Second Modification)

A second modification will be described. In the present modification, the configuration of the first embodiment is modified as follows. Description of configurations, operations, and effects similar to those of the first embodiment will be omitted. A monitoring apparatus 100 of the present modification is different from that of the first embodiment in that the degree of anomaly in a system is calculated using a measurement value of each sensor belonging to a second sensor set and second data, and the presence or absence of the anomaly in the system is determined using the calculated degree of anomaly.

FIG. 12 is a diagram showing an example of a configuration of the monitoring apparatus 100 according to the present modification. The processing circuit of the monitoring apparatus 100 further includes a degree-of-anomaly calculation unit 1201.

The degree-of-anomaly calculation unit 1201 calculates the degree of anomaly of the system based on measurement value data and the second data. Specifically, the degree-of-anomaly calculation unit 1201 detects the degree of anomaly in the system based on the measurement value of each sensor belonging to the second sensor set included in measurement value data, and the prediction value of each sensor belonging to the second sensor set included in the second data.

The anomaly detection unit 106 detects an anomaly in the system by comparing the magnitude relationship between the degree of anomaly in the system and a predetermined threshold. For example, in a case where the degree of anomaly is higher than the threshold, the anomaly detection unit 106 determines that there is an anomaly in the system and detects the anomaly. On the other hand, in a case where the degree of anomaly is equal to or lower than the threshold, the anomaly detection unit 106 determines that there is no anomaly in the system. Similarly to the first embodiment, the anomaly detection unit 106 makes it difficult to detect an anomaly in a case where the determination signal indicates a change.

Next, an operation of a process performed by the monitoring apparatus 100 will be described. FIG. 13 is a flowchart showing an example of a monitoring process. Since the processes in steps S1301 to S1305 are the same as the processes in steps S201 to S205 in the first embodiment, description thereof will be omitted. Note that the processing procedure in each process described below is merely an example, and each process can be appropriately changed as much as possible. Furthermore, in the processing procedure described below, it is possible to appropriately omit, replace, and add steps according to the embodiment.

(Monitoring Process)

(Step S1306)

The degree-of-anomaly calculation unit 1201 of the anomaly detection unit 106 acquires measurement value data and second data. The degree-of-anomaly calculation unit 1201 acquires a measurement value of each sensor belonging to the second sensor set from the measurement value data. The degree-of-anomaly calculation unit 1201 also extracts a prediction value of each sensor belonging to the second sensor set from the second data.

The degree-of-anomaly calculation unit 1201 calculates the degree of anomaly in the system using the following expression (6).

$$A_t = \|y_t - \widehat{y_t}\|^2 \qquad (6)$$

In the expression (6), $A_t$ represents the degree of anomaly in the system at a time t. $\hat{y}_t$ represents a vector in which the prediction values of the individual sensors belonging to the second sensor set included in the second data are arranged. $y_t$ represents a vector in which the measurement values of the individual sensors belonging to the second sensor set included in the measurement value data at the time t are arranged in the same order as the second data.

(Step S1307)

The anomaly detection unit 106 acquires the degree of anomaly and the determination signal. The anomaly detection unit 106 performs an anomaly detection process using the degree of anomaly in the system. In the anomaly detection process, if the degree of anomaly in the system is larger than a predetermined threshold, the anomaly detection unit 106 determines that there is an anomaly in the system. On the other hand, if the degree of anomaly in the system is equal to or lower than the threshold, the anomaly detection unit 106 determines that there is no anomaly in the system. Furthermore, similarly to the first embodiment, the anomaly detection unit 106 makes it difficult to detect an anomaly in a case where the control signal changes at a time of interest.

Hereinafter, effects of the monitoring apparatus 100 according to the present modification will be described.

The degree of anomaly in the system is generated by referring to the prediction value and the measurement value of each sensor belonging to the second sensor set included in the second data. Accordingly, the degree of anomaly in the system changes in conjunction with the change in the measurement value of the first sensor included in the second sensor set. Furthermore, the measurement value of the first sensor included in the second sensor set changes in conjunction with the change in the control signal. That is, the degree of anomaly in the system changed suddenly in conjunction with the change in the control signal. As described above, in the system, the change in the measurement value of the first sensor after the change in the control signal is a normal behavior.

In a case where the degree of anomaly in the system exceeds the threshold, it is determined in the anomaly detection process that there is an anomaly in the system. For this reason, in a case where the control signal changes suddenly, there is a high possibility that an erroneous detection occurs in which the system is detected as anomalous, although the behavior of the measurement value of the first sensor is normal. As described above, in a case where anomaly detection is performed by utilizing a model using the correlation between sensors, an erroneous detection may occur in which the system is determined as anomalous although the system is normal due to the conjunction of the change in the control signal with the measurement value of the first sensor.

The monitoring apparatus 100 of the present modification can calculate the degree of anomaly in the system based on the measurement value of each sensor belonging to the second sensor set and the second data, and detect the anomaly in the system based on the degree of anomaly and the threshold.

With the above configuration, according to the monitoring apparatus 100 of the present modification, even in a case where the degree of anomaly in the system increases due to the change in the control signal although the system is normal, by executing control to make it difficult to detect an anomaly in a case where the determination signal changes, it is possible to suppress an erroneous detection in which an anomaly is erroneously detected.

Figure 14:
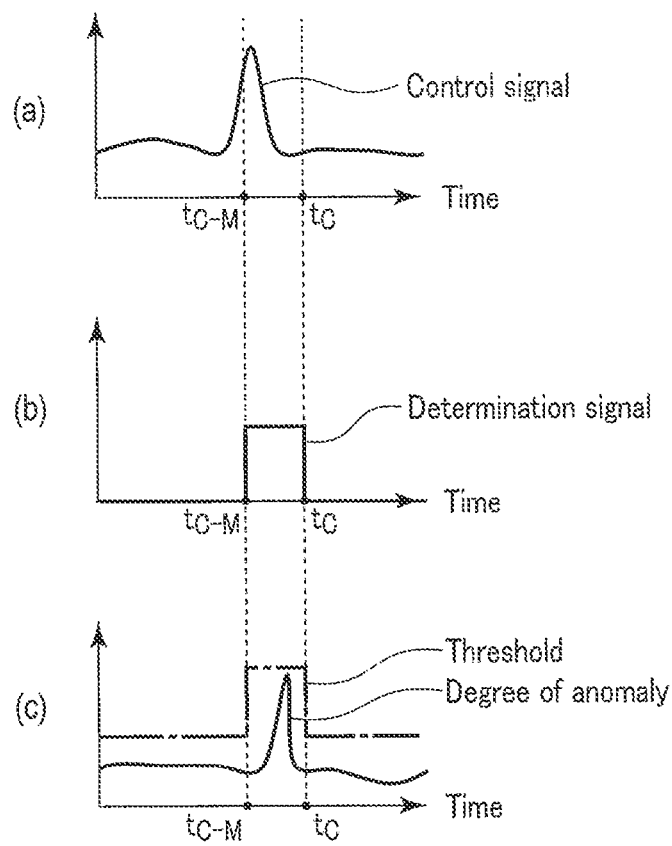
FIG. 14 is diagram for explaining a method of suppressing an erroneous detection by the monitoring apparatus according to the second modification.

FIG. 14 is diagram for explaining a method of suppressing an erroneous detection by the monitoring apparatus 100 according to the present modification. FIG. 14(a) is a diagram showing an example of a time-series change in a control signal in a predetermined operation mode. The horizontal axis in FIG. 14(a) represents a time. The vertical axis in FIG. 14(a) represents a value of the control signal. FIG. 14(b) shows an example of a time-series graph of a determination signal generated as a result of determination of the control signal shown in FIG. 14(a). The horizontal axis in FIG. 14(b) represents a time. The vertical axis in FIG. 14(b) represents a value of the determination signal. The horizontal axis in FIG. 14(b) is synchronized with the horizontal axis in FIG. 14(a).

FIG. 14(c) is a diagram showing an example of a time-series change in the degree of anomaly in a system. The horizontal axis in FIG. 14(c) represents a time synchronized with the horizontal axes in FIGS. 14(a) and 14(b). The vertical axis in FIG. 14(c) represents a value of the degree of anomaly in the system. The solid line in FIG. 14(c) indicates the degree of anomaly. In FIG. 14(c), the degree of anomaly also changes suddenly in conjunction with the change in the control signal. Furthermore, the alternate long and short dash line in FIG. 14(c) indicates a threshold for the degree of anomaly. It can be seen in FIGS. 14(b) and 14(c) that in a case where the determination signal changes in the period of interest, the control signal changes in the period of interest, and the threshold in the period of interest is larger than those at other times.

(Third Modification)

Note that the information used for the monitoring process and the anomaly detection process and the anomaly detection result can be displayed on a display. In this case, the monitoring apparatus 100 includes a display control unit that controls a screen to be displayed on the display. The display control unit displays, for example, a first graph representing a time-series change in the measurement value, the prediction value, or the difference between the measurement value and the prediction value and a second graph representing a time-series change in the control signal or the determination signal on the display, side by side or in an overlapping manner with the scales of the time axes aligned. The display can be provided inside the monitoring apparatus 100 or can be provided outside the monitoring apparatus 100. A user can know the reason why the anomaly is detected or the reason why the anomaly is not detected by checking the information displayed on the display.

For example, the display control unit displays the time-series graph of the control signal as shown in FIG. 6(a) on the display. FIG. 6(a) is an example of the second graph. In this case, the user can easily check the timing when the control signal changes.

Alternatively, the display control unit can display the time-series graph of the control signal as shown in FIG. 6(b) on the display. FIG. 6(b) is an example of the second graph. In this case, the user can easily check the timing when control is executed to make it difficult to detect an anomaly due to the change in the determination signal.

Alternatively, the display control unit can display the time-series graph of the measurement value and the prediction value of the second sensor as shown in FIG. 6(c) on the display. FIG. 6(c) is an example of the first graph. In this case, the user can easily check the change in the measurement value and the prediction value of the second sensor.

Alternatively, the display control unit can display the time-series graph of the difference between the measurement value and the prediction value of the second sensor included in the second sensor set as shown in FIG. 6(d) on the display. FIG. 6(d) is an example of the first graph. In this case, the user can easily check the change in the difference between the measurement value and the prediction value of the second sensor included in the second sensor set and the change in the threshold controlled depending on the determination signal.

Furthermore, the display control unit can display the time-series graphs shown in FIGS. 6(a) to 6(d) side by side on the display. In this case, the user can easily check the timing when it is determined that the control signal changes and the determination signal increases. In addition, the user can easily check whether or not the reason why no anomaly is detected although the absolute value of the difference between the measurement value and the prediction value of the second sensor is large is the control to make it difficult to detect an anomaly. Moreover, the user can easily check whether the increase in the absolute value of the difference between the measurement value and the prediction value is caused by the sudden change in the measurement value of the first sensor due to the change in the control signal or the conjunction of the measurement value of the first sensor with the prediction value of the second sensor.

Further, as shown in FIGS. 6(a) to 6(d), a vertical line representing a specific time can be displayed on the display. In this case, the times in FIGS. 6(a) to 6(d) are synchronized, and thus it is easy to view the graphs. It is preferable to allow the user to set the time of the vertical line via a user interface such as a mouse.

In addition, the time-series graphs illustrated in FIGS. 6(a) to 6(d) can be displayed in an overlapping manner in a common area sharing the vertical axis. In this case, the display space can be reduced.

Moreover, the display control unit can display, for example, the second graph representing the time-series change in the control signal or the determination signal and a third graph representing a time-series change in the degree of anomaly in the system on the display, side by side or in an overlapping manner with the scales of the time axes aligned.

For example, the display control unit can display the time-series graph of the degree of anomaly as shown in FIG. 14(c) of the second modification on the display. FIG. 14(c) is an example of the third graph. In this case, the user can easily check the change in the degree of anomaly and the change in the threshold controlled depending on the determination signal.

Furthermore, the time-series graphs shown in FIGS. 14(a) to 14(c) of the second modification can be displayed side by side on the display. The graphs shown in FIGS. 14(a) and 14(b) are examples of the second graph. In this case, the user can easily check whether or not the timing when the degree of anomaly increases is later than the timing when the control signal changes.

Further, as shown in FIGS. 14(a) to 14(c), a vertical line representing a specific time can be displayed. In this case, the times in FIGS. 14(a) to 14(c) are synchronized, and thus it is easy to view the graphs. It is preferable to allow the user to set the time of the vertical line via a user interface such as a mouse.

In addition, the time-series graphs illustrated in FIGS. 14(a) to 14(c) can be displayed in an overlapping manner in a common area sharing the vertical axis. In this case, the display space can be reduced.

(Fourth Modification)

Furthermore, the predetermined time M, which is the length of the period of interest, can be appropriately changed. In this case, for example, the determination unit 104 sets the predetermined time M that is the time for determining the change in the control signal depending on the type of the control signal, the type of the first sensor, the type of the second sensor, or the type of the system. For example, a table in which the type of the apparatus or the system and the setting value of the time M are associated with each other is stored in a storage medium, and an appropriate setting value is set using the table. In addition, the setting value of the predetermined time M can be input from the outside of the monitoring apparatus 100 by a user or the like.

The time from when the control signal changes to when the measurement value of the first sensor changes suddenly varies depending on the types of the control signal and the first sensor. In addition, when the state of the system changes, the time from when the control signal changes to when the measurement value of the first sensor changes suddenly may change. Even in such a case, by appropriately setting the predetermined time M, it is possible to handle the change in time from when the control signal changes to when the measurement value of the first sensor changes suddenly.

Moreover, in a case where the monitoring apparatus 100 is used to monitor a plurality of different systems, the time from when the control signal changes to when the measurement value of the first sensor changes suddenly varies among the systems. Also in this case, it is possible to handle the different systems by appropriately setting the predetermined time M depending on the system to be monitored.

Figure 15:
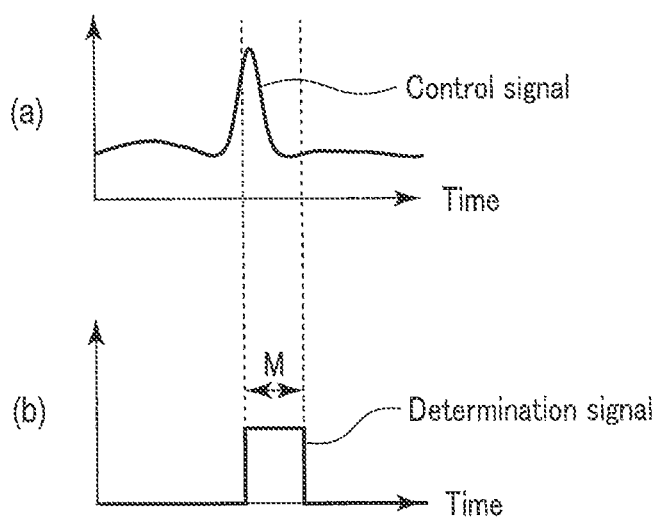
FIG. 15 is diagram showing an example of a display screen that displays a time of a period of interest.

In addition, the time M, which is the length of the period of interest, can be displayed on the display. In this case, for example, the time M can be displayed in a dialog box. Alternatively, the time M can be displayed on the graph representing the time-series change in the determination signal. FIG. 15 is diagram showing an example of a display screen that displays the time M. FIG. 15(a) is a diagram showing an example of a time-series change in a control signal in a predetermined operation mode. The horizontal axis in FIG. 15(a) represents a time. The vertical axis in FIG. 15(a) represents a value of the control signal. FIG. 15(b) is a diagram illustrating a state where the predetermined time M is displayed in the time-series graph of the determination signal. The horizontal axis in FIG. 15(b) represents a time. The vertical axis in FIG. 15(b) represents a value of the determination signal. By displaying the predetermined time M on the display, the user can easily check the setting of the time M. In particular, in a case where the time M is changed depending on the types of the control signal and the first sensor or the change in the system to be monitored, it is significant that the setting of the time M can be checked.

As shown in FIGS. 15(a) and 15(b), the time M can be displayed by indicating auxiliary lines in the time-series graphs of the control signal and the determination signal. In this case, it is preferable to allow the user to move the lateral position of the auxiliary line via a user interface such as a mouse.

(Fifth Modification)

Note that the predetermined time R used as the threshold in the second modification can be appropriately changed. In this case, for example, the anomaly detection unit 106 sets the predetermined time R that is a threshold for the duration of the threshold excess depending on the type of the control signal, the type of the first sensor, the type of the second sensor, or the type of the system. At this time, the time R can be set in each sensor. For example, a table in which the type of the apparatus or the system or a sensor ID or a sensor name and the setting value of the time R are associated with each other is stored in a storage medium, and an appropriate setting value is set using the table. In addition, the setting value of the predetermined time R can be input from the outside of the monitoring apparatus 100 by a user or the like.

The duration of the sudden change in the measurement value of the first sensor due to the change in the control signal and the duration of the sudden change in the prediction value of the second sensor in conjunction with the sudden change in the measurement value of the first sensor vary depending on the types of the control signal, the first sensor, and the second sensor, and combinations thereof. In addition, the duration of these sudden changes also varies depending on the state of the system. Even in such a case, it is possible to handle the change in the duration of the sudden change by appropriately setting the predetermined time R.

Moreover, in a case where the monitoring apparatus 100 is used to monitor a plurality of different systems, the duration of the sudden change varies among the systems. Also in this case, it is possible to handle the different systems by appropriately setting the predetermined time R depending on the system to be monitored.

Furthermore, the predetermined time R can be displayed on a display. In this case, for example, the time R can be displayed in a dialog box. Alternatively, the time R can be displayed on a graph representing the time-series change in the difference between the measurement value and the prediction value of the second sensor. FIG. 16 is a diagram showing an example of a display screen that displays the time R which is a threshold for an excess time. The horizontal axis in FIG. 16 represents a time. The vertical axis in FIG. 16 represents a value of the second sensor. The broken line in FIG. 16 indicates the difference between the measurement value and the prediction value of the second sensor. The alternate long and short dash line in FIG. 16 indicates a threshold. By displaying the predetermined time R on the display, the user can easily check the setting of the time R. In particular, in a case where the time R is changed depending on the types of the control signal, the first sensor, and the second sensor or the change in the system to be monitored, it is significant that the setting of the time R can be checked. In addition, the user can also easily check the relationship between the time R and the time when the difference between the measurement value and the prediction value of the second sensor continuously exceeds a threshold.

Further, as shown in FIG. 16, the time R can be displayed by indicating auxiliary lines in the time-series graph of the difference between the measurement value and the prediction value of the second sensor. In this case, it is preferable to allow the user to move the lateral position of the auxiliary line via a user interface such as a mouse.

(Sixth Modification)

An example of using, as the first data ($x_t$) input to the model, a vector in which measurement values at the time t of the individual sensors belonging to the first sensor set or values obtained by normalizing or normalizing the measurement values are arranged has been described in the first embodiment. However, a vector in which measurement values at a single time before the time t of the individual sensors belonging to the first sensor set or values obtained by normalizing or normalizing the measurement values are arranged can be used as the first data ($x_t$).

For example, in a case where the first data ($x_t$) is a vector in which measurement values at a single time before the time t or values obtained by normalizing or standardizing the measurement values are arranged, the second data ($\hat{y}_t$) at the time t is predicted from the first data ($x_t$) including data at a single time before the time t. Furthermore, in a case where the first data ($x_t$) is a vector in which measurement values at a plurality of times before the time t or values obtained by normalizing or standardizing the measurement values are arranged, the second data ($\hat{y}_t$) at the time t is predicted from the first data ($x_t$) including data at the times before the time t. Further, in a case where the first data ($x_t$) is a vector in which measurement values at the time t and a time before the time t or values obtained by normalizing or standardizing the measurement values are arranged, the second data ($\hat{y}_t$) at the time t is predicted from the first data ($x_t$) including data at the times before the time t.

The present modification relates to input and output of a model, and thus attention is required. In a case where the first data ($x_t$) is a vector in which the measurement values at the time t and a time before the time t or values obtained by normalizing or standardizing the measurement values are arranged, $y_t$ representing a vector in which the measurement values at the time t of the individual sensors included in the second sensor set are arranged and the second data ($\hat{y}_t$) can be handled as the data at the time t and a time before the time t, then a machine learning model can be trained, and the prediction value at the time t can be generated by extracting the portion at the time t from the second data ($\hat{y}_t$) output from a model (f).

In the present modification, although the contents of the first data ($x_t$) are changed, the same effects as those of the first embodiment can be obtained.

(Seventh Modification)

The first data can include a control signal in addition to the measurement value of each sensor belonging to the first sensor set including the first sensor as an element. In this case, the model is trained using the first data including the control signal. As the prediction unit 105 uses the model trained using the first data including the control signal, the conjunction of the prediction value of the second sensor with the measurement value of the first sensor is reduced depending on the value of the control signal, and the reproducibility of the prediction value of the second sensor with respect to the measurement value of the second sensor is increased. As a result, it is possible to suppress an erroneous detection due to the conjunction of the prediction value of the second sensor with the measurement value of the first sensor.

Therefore, according to any one of the embodiments described above, it is possible to provide a monitoring apparatus, a method, and a program capable of suppressing an erroneous detection in detecting an anomaly in a system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A monitoring apparatus comprising:
a processing circuit,
wherein the processing circuit is configured to
acquire measurement values of sensors installed in a system,
acquire a control signal from the system,
acquire a model that generates second data including a prediction value of each of sensors belonging to a second sensor set including, as an element, a second sensor correlated with a first sensor when first data is input, the first data including a measurement value of each of sensors belonging to a first sensor set including, as an element, the first sensor of which a measurement value changes suddenly in a case where the control signal changes during a predetermined operation mode,
generate a determination signal by determining a change in the control signal,
generate the second data including a prediction value of each of the sensors belonging to the second sensor set from the first data included in the measurement value and the model, and
detect an anomaly of the system or an anomaly of at least one sensor belonging to the second sensor set based on a measurement value of each of the sensors belonging to the second sensor set, the second data, the determination signal, and a threshold, and
wherein the processing circuit is configured to restrict detection of the anomaly in a case where the determination signal indicates that there is a change in the control signal.

2. The monitoring apparatus according to claim 1, wherein the control signal includes any one of a feedback control signal, a feedforward control signal, and a control signal with low correlation with a change in the operation mode and with an irregular change.

3. The monitoring apparatus according to claim 1, wherein the control signal includes, any one of a boiler input regulator (BIR) signal, a soot blower signal, a signal related to start and stop of a fuel apparatus, a signal indicating a number of starting fuel apparatuses, and a signal indicating switching of a fuel type.

4. The monitoring apparatus according to claim 1, wherein the processing circuit is configured to restrict detection of the anomaly by executing control so as not to detect the anomaly in a case where the determination signal indicates that there is a change in the control signal.

5. The monitoring apparatus according to claim 1, wherein the processing circuit is configured to change the threshold depending on the determination signal.

6. The monitoring apparatus according to claim 1, wherein the processing circuit is configured to
temporarily detect an excess of the threshold related to the system or at least one sensor belonging to the second sensor set based on a measurement value of each of sensors belonging to the second sensor set, the second data, and the threshold,
acquire a duration of the excess of the threshold, and
restrict detection of the anomaly as compared with a case where the determination signal indicates no change in the control signal, in a case where the duration is shorter than a predetermined time and the determination signal indicates a change in the control signal.

7. The monitoring apparatus according to claim 1, wherein the processing circuit is configured to
calculate a degree of anomaly in the system based on a measurement value of each of sensors belonging to the second sensor set and the second data, and
detect an anomaly in the system based on the degree of anomaly and the threshold.

8. The monitoring apparatus according to claim 1, wherein processing circuit is configured to
calculate a difference between a measurement value and a prediction value of a sensor belonging to the second sensor set, and
detect an anomaly of the sensor belonging to the second sensor set based on the difference and the threshold.

9. The monitoring apparatus according to claim 1, wherein the processing circuit is configured to restrict detection of the anomaly only in a sensor belonging to a third sensor set including only the first sensor and the second sensor among sensors belonging to the second sensor set in a case where the determination signal indicates that there is a change in the control signal.

10. The monitoring apparatus according to claim 1, wherein the processing circuit is configured to display, on a display, a first graph representing a time-series change in the measurement value, the prediction value, or a difference between the measurement value and the prediction value and a second graph representing a time-series change in the control signal or the determination signal, side by side or in an overlapping manner with scales of time axes aligned.

11. The monitoring apparatus according to claim 7, wherein the processing circuit is configured to display, on a display, a second graph representing a time-series change in the control signal or the determination signal and a third graph representing a time-series change in a degree of anomaly in the system, side by side or in an overlapping manner with scales of time axes aligned.

12. The monitoring apparatus according to claim 1, wherein the processing circuit is configured to set a time for determining a change in the control signal depending on a type of the control signal, a type of the first sensor, a type of the second sensor, or a type of the system.

13. The monitoring apparatus according to claim 6, wherein the processing circuit is configured to set the predetermined time depending on a type of the control signal, a type of the first sensor, a type of the second sensor, or a type of the system.

14. A method comprising:
acquiring measurement values of sensors installed in a system;
acquiring a control signal from the system;
acquiring a model that generates second data including a prediction value of each of sensors belonging to a second sensor set including, as an element, a second sensor correlated with a first sensor when first data is input, the first data including a measurement value of each of sensors belonging to a first sensor set including, as an element, the first sensor of which a measurement value changes suddenly in a case where the control signal changes during a predetermined operation mode;
generating a determination signal by determining a change in the control signal;
generating the second data including a prediction value of each of the sensors belonging to the second sensor set from the first data included in the measurement value and the model;
detecting an anomaly of the system or an anomaly of at least one sensor belonging to the second sensor set based on a measurement value of each of the sensors belonging to the second sensor set, the second data, the determination signal, and a threshold; and
restricting detection of the anomaly in a case where the determination signal indicates that there is a change in the control signal.

15. A non-transitory computer-readable storage medium storing a program for causing a computer to execute:
a function of acquiring measurement values of sensors installed in a system;
a function of acquiring a control signal from the system;
a function of acquiring a model that generates second data including a prediction value of each of sensors belonging to a second sensor set including, as an element, a second sensor correlated with a first sensor when first data is input, the first data including a measurement value of each of sensors belonging to a first sensor set including, as an element, the first sensor of which a measurement value changes suddenly in a case where the control signal changes during a predetermined operation mode;
a function of generating a determination signal by determining a change in the control signal;
a function of generating the second data including a prediction value of each of the sensors belonging to the second sensor set from the first data included in the measurement value and the model;
a function of detecting an anomaly of the system or an anomaly of at least one sensor belonging to the second sensor set based on a measurement value of each of the sensors belonging to the second sensor set, the second data, the determination signal, and a threshold; and
a function of restricting detection of the anomaly in a case where the determination signal indicates that there is a change in the control signal.

* * * * *